United States Patent
Hosseini et al.

(10) Patent No.: US 11,832,219 B2
(45) Date of Patent: Nov. 28, 2023

(54) FRAME-MATCHING SIDELINK COMMUNICATION AROUND SIDELINK RS

(71) Applicant: QUALCOMM Incorporated, San Diego, CA (US)

(72) Inventors: Seyedkianoush Hosseini, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/394,939

(22) Filed: Aug. 5, 2021

(65) Prior Publication Data

US 2023/0040453 A1 Feb. 9, 2023

(51) Int. Cl.
*H04W 72/02* (2009.01)
*H04W 72/0453* (2023.01)
*H04L 5/00* (2006.01)
*H04W 8/24* (2009.01)
*H04W 72/0446* (2023.01)
*H04W 92/18* (2009.01)

(52) U.S. Cl.
CPC ........... *H04W 72/02* (2013.01); *H04L 5/0051* (2013.01); *H04W 8/24* (2013.01); *H04W 72/0446* (2013.01); *H04W 72/0453* (2013.01); *H04W 92/18* (2013.01)

(58) Field of Classification Search
CPC ... H04W 72/02; H04W 8/24; H04W 72/0446; H04W 72/0453; H04W 92/18; H04W 8/005; H04L 5/0051
See application file for complete search history.

(56) References Cited

U.S. PATENT DOCUMENTS

| 2021/0218509 A1* | 7/2021 | Wu | H04L 1/1861 |
| 2022/0191847 A1* | 6/2022 | Hong | H04L 5/0055 |
| 2022/0399917 A1* | 12/2022 | Shin | H04B 17/318 |

* cited by examiner

*Primary Examiner* — Chae S Lee
(74) *Attorney, Agent, or Firm* — Procopio, Cory, Hargreaves & Savitch LLP

(57) ABSTRACT

The apparatus may include a base station and UEs configured to communicate via sidelink communication. The UEs may select transmission resources from a resource pool including first periodic resources for PSFCH and second periodic resources for SL-RS, and rate-match the PSSCH around at least one of the first period resources or the second period resources. The second periodic resources may be shifted in time or canceled based on the first periodic resources. The base station may configure the UEs based on the UEs' capabilities to support the SL-RS and rate-matching the PSSCH around the multiplexed SL-RS and PSFCH.

30 Claims, 19 Drawing Sheets

FRAME-MATCHING SIDELINK COMMUNICATION AROUND SIDELINK RS

INTRODUCTION

The present disclosure relates generally to communication systems, and more particularly, to sidelink communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. A UE may be configured by the base station to communicate the physical sidelink shared channel (PSSCH)/physical sidelink control channel (PSCCH) on the resource pool, and the UE may support features associated with the standalone sidelink reference signal (SL-RS), the standalone SL-RS referring to SL-RS configured separate from or independent of the PSSCH. That is, the BW of SL-RS transmitted by a UE may be independent of the BW of the PSSCH transmitted by the UE. The transmission of a SL-RS may also be independent of the transmission of the PSSCH or any other physical channels. The sidelink SL-RS may include zero power (ZP) SL channel state information (CSI) RS (CSI-RS) (ZP SL CSI-RS), non-zero power (NZP) SL CSI-RS (NZP SL CSI-RS), SL CSI interference measurement (IM) (SL CSI-IM), SL sounding reference signal (SRS) (SL SRS), SL positioning reference signal (PRS) (SL PRS), etc. The UE may select the resources for the standalone SL-RS based on the physical sidelink feedback channel (PSFCH), and rate-match the PSSCH around the standalone SL-RS and the PSFCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
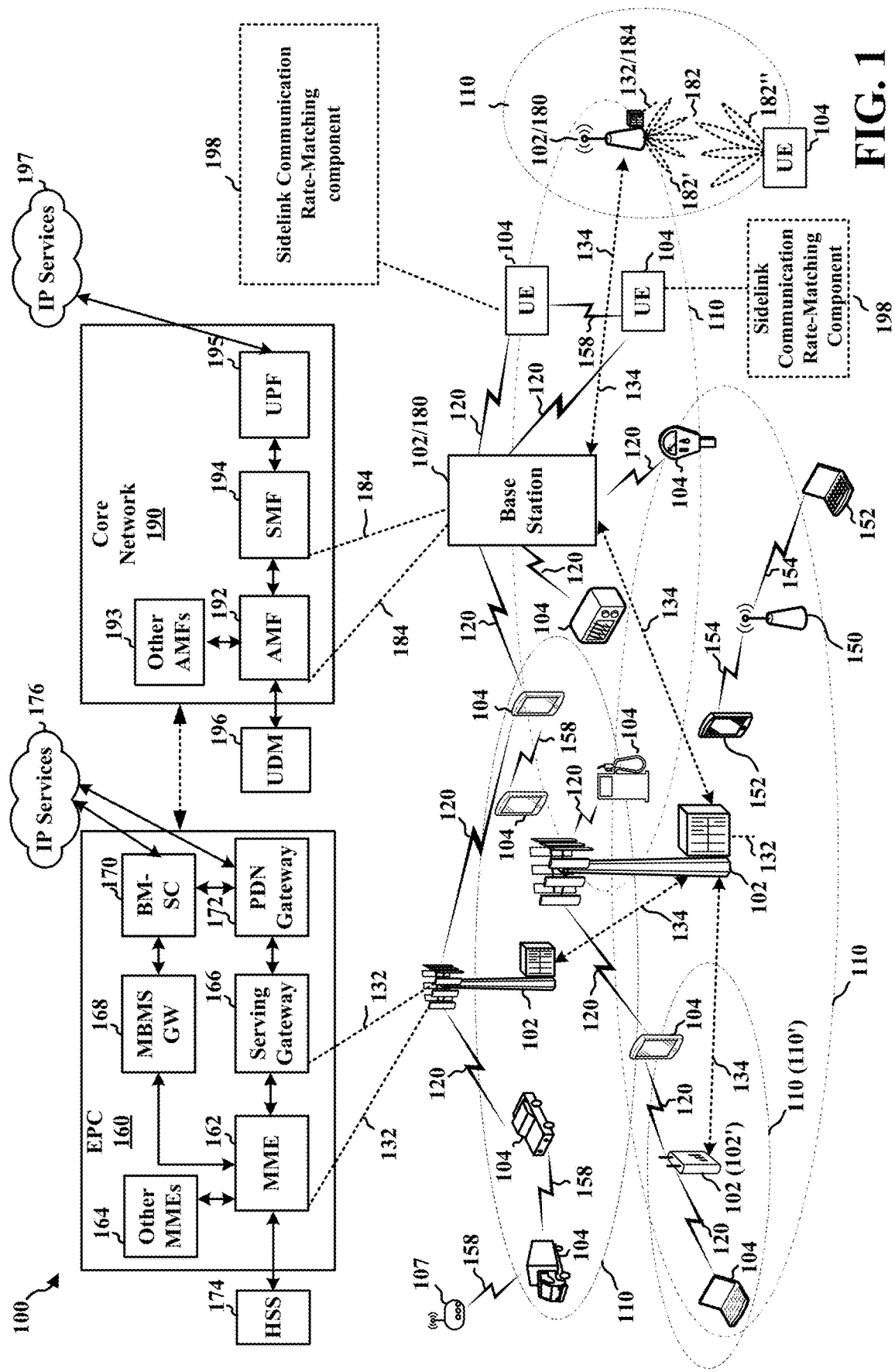
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

In some aspects, the UE may transmit the standalone SL-RS for CSI report on the sidelink communication. The standalone SL-RS may refer to the SL-RS configured separate from or independent of the PSSCH. That is, the BW of SL-RS transmitted by a UE may be independent of the BW of the PSSCH transmitted by the UE. The transmission of a SL-RS may also be independent of the transmission of the PSSCH or any other physical channels. The sidelink SL-RS may include ZP SL CSI-RS, NZP SL CSI-RS, SL CSI-IM, SL SRS, SL PRS, etc. Because the standalone SL-RS and the PSFCH may be configured in the same slot, the UE may multiplex the standalone SL-RS and the PSFCH. The UE may also rate-match the PSSCH/PSCCH around the standalone SL-RS and the PSFCH. Also, the base station may configure a set of slots to accommodate the sidelink UEs including a first set of UEs that has a UE capability to support the standalone SL-RS and a second set of UEs that lacks the capability to support the standalone SL-RS.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink communication rate-matching component 198 configured to select transmission resources from a resource pool having first periodic resources for at least one of a PSFCH or a gap associated with the PSFCH and second periodic resources for a SL-RS, rate-match a sidelink transmission around at least one of the first periodic resources for the PSFCH or the second periodic resources for the SL-RS, and transmit the sidelink transmission, or receive a sidelink transmission in a resource pool having first periodic resources for at least one of a PSFCH or a gap associated with the PSFCH and second periodic resources for a SL-RS, and de-rate-match a sidelink transmission around at least one of the first periodic resources for the PSFCH or the second periodic resources for the SL-RS.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
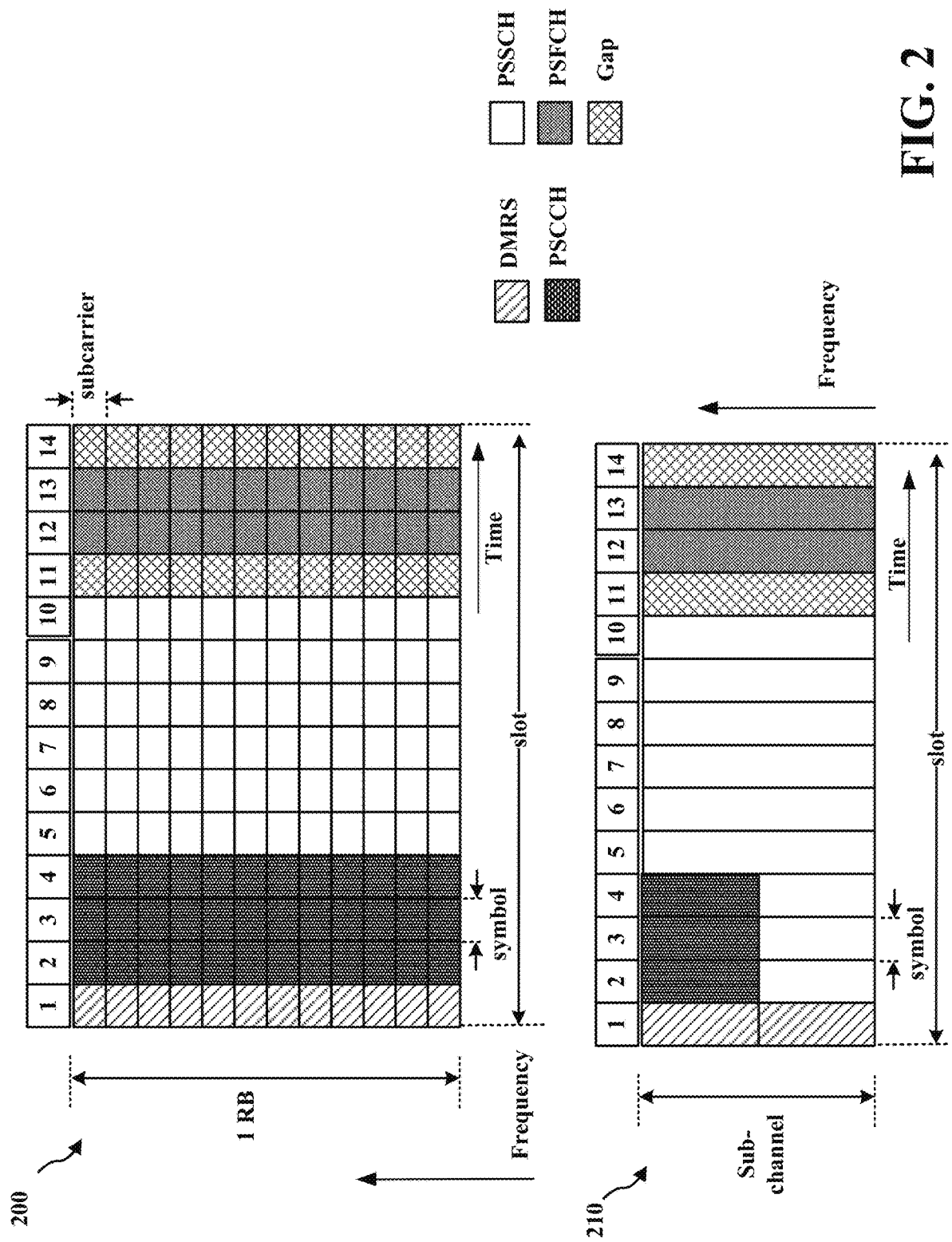
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
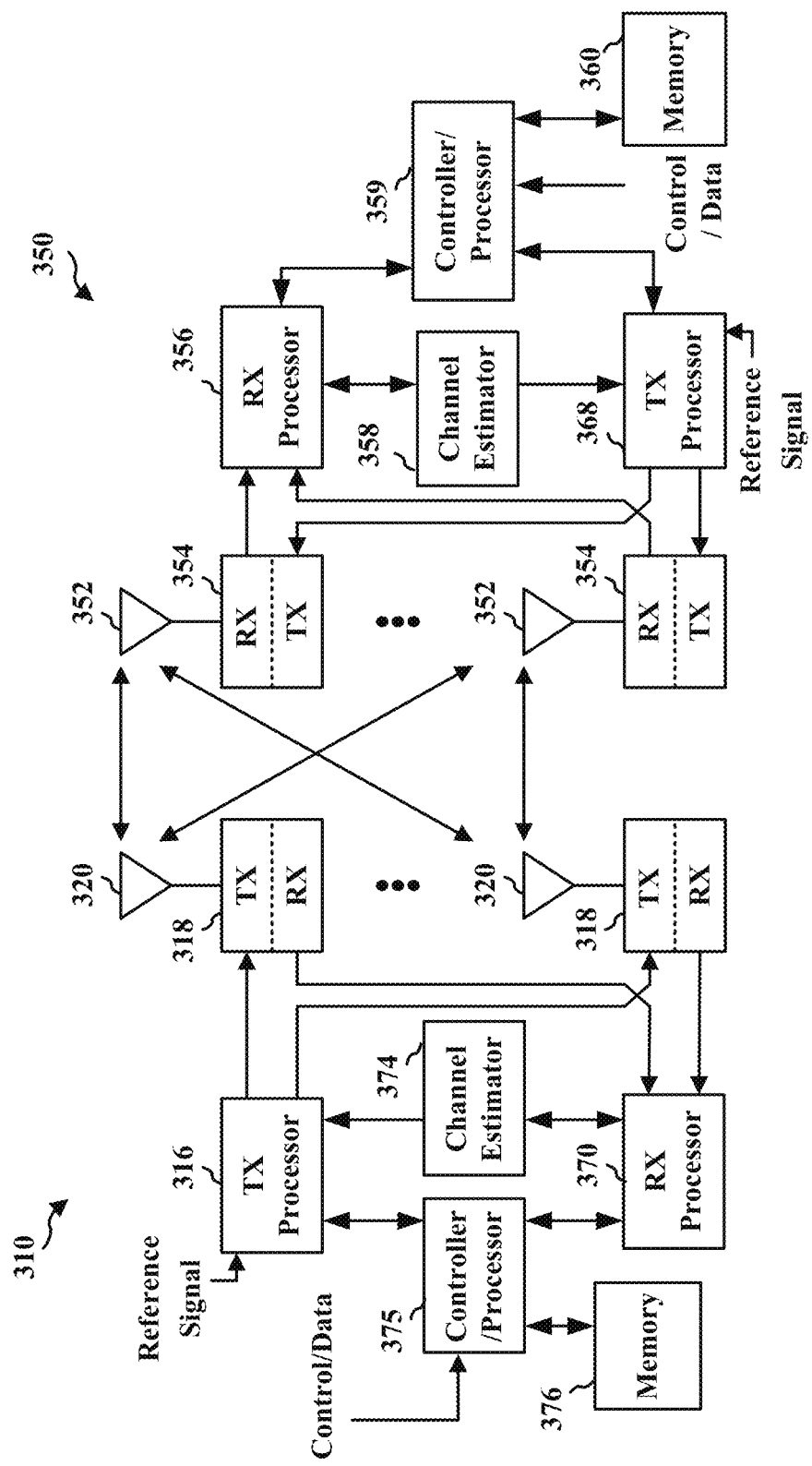
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Figure 4:
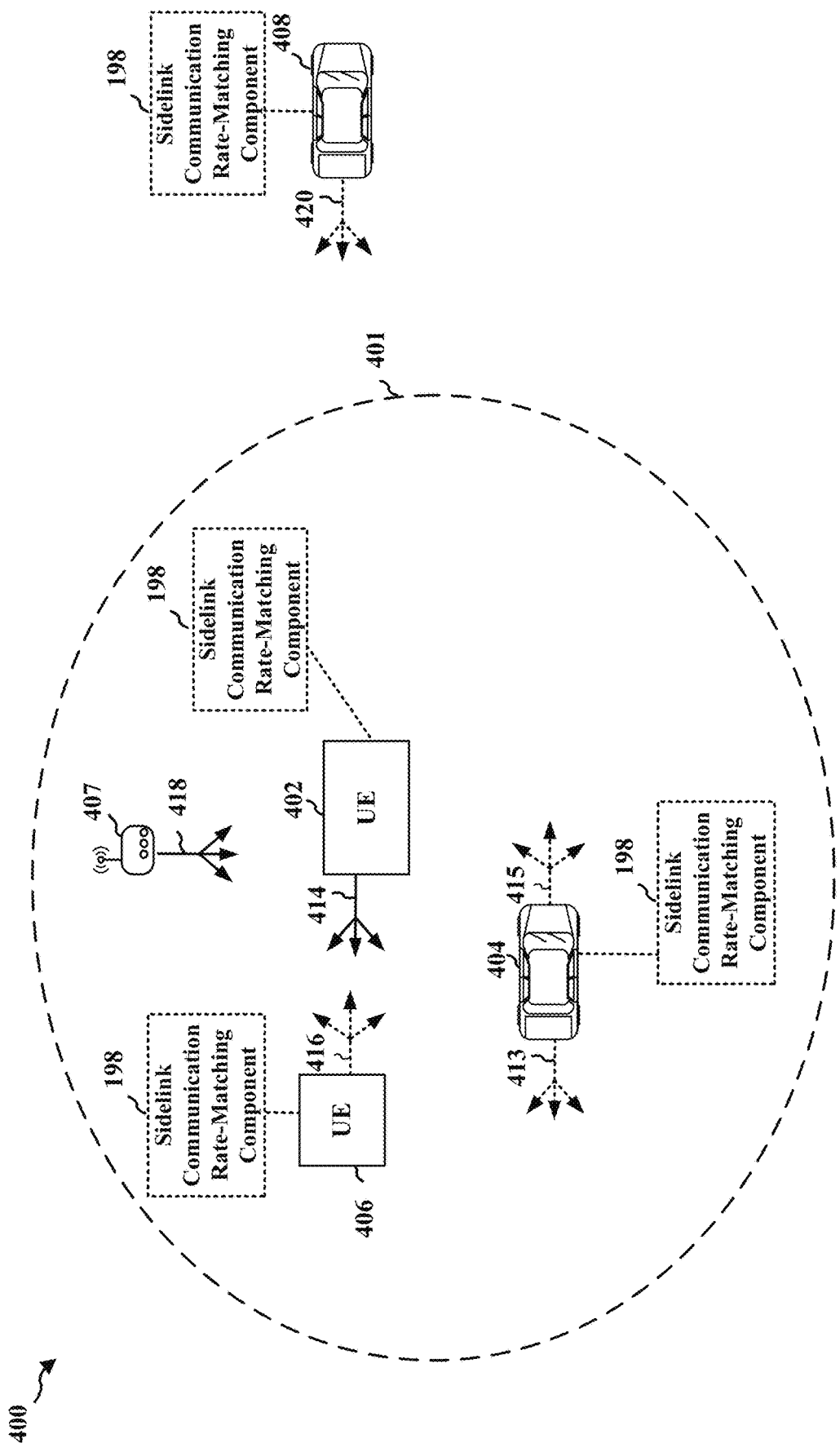
FIG. 4 illustrates example aspects of sidelink communication between devices, in accordance with aspects presented herein.

FIG. 4 illustrates an example 400 of sidelink communication between devices. The communication may be based on a slot structure comprising aspects described in connection with FIG. 2. For example, the UE 402 may transmit a sidelink transmission 414, e.g., comprising a control channel (e.g., PSCCH) and/or a corresponding data channel (e.g., PSSCH), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast or multicast to nearby devices. For example, UE 404 may transmit communication 413, 415 intended for receipt by other UEs within a range 401 of UE 404, and UE 406 may transmit communication 416. Additionally/alternatively, RSU 407 may receive communication from and/or transmit communication 418 to UEs 402, 404, 406, 408. One or more of the UEs 402, 404, 406, 408 or the RSU 407 may comprise a sidelink communication rate-matching component 198 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field comprised in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
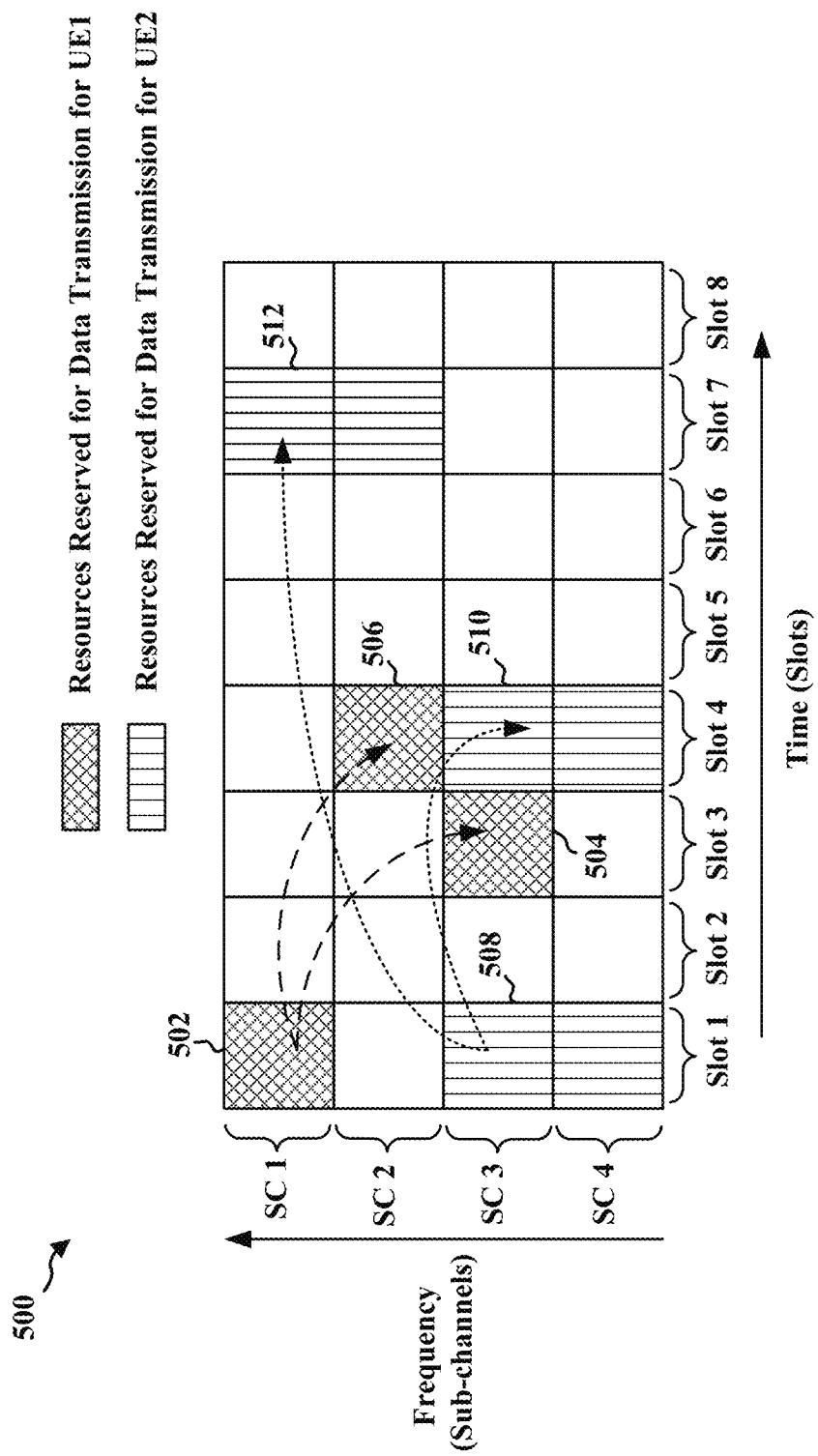
FIG. 5 illustrates examples of resource reservation for sidelink communication.

FIG. 5 is an example 500 of time and frequency resources showing reservations for sidelink transmissions. The resources may be comprised in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., 504 and 506). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 5 illustrates that a second UE ("UE2") reserves resources in sub-channels SC 3 and SC 4 at time slot 1 for its current data transmission 508, and reserve first data retransmission 510 at time slot 4 using sub-channels SC 3 and SC 4, and reserve second data retransmission 512 at time slot 7 using sub-channels SC 1 and SC 2 as shown by FIG. 5. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIS within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 5, the UE may transmit SCI reserving resources for data transmissions 508, 510, and 512.

In some aspects, UEs communicating via sidelink communication may transmit CSI reporting. That is, a transmitting UE may transmit a sidelink reference signal (SL-RS) via a PSSCH of the sidelink communication, and a receiving UE may measure or estimate the received SL-RS to generate a channel state information (CSI) report of the PSSCH. As an example of SL-RS, a UE may transmit sidelink CSI-RS, or other SL-RS, within a unicast PSSCH transmission based on the CSI reporting being enabled and/or the CSI being requested. In one aspect, the CSI reporting may be enabled by higher layer parameter, e.g., sl-CSI-Acquisition. In another aspect, the CSI request may be indicated by a CSI request field in the corresponding SCI format 0-2 being set to indicate enabled, e.g., 1.

For each CSI-RS transmission configuration, various parameters may be configured by a higher layer signaling. In one aspect, a parameter may indicate a number of ports for the SL CSI-RS (e.g., nrofPortsCSIRS-SL). For example, the parameter may indicate that 1 or 2 antenna ports are supported. In another aspect, a parameter may indicate a first OFDM symbol in a PRB used for SL CSI-RS (e.g., firstSymbolInTimeDomainCSIRS-SL). In another aspect, a parameter may indicate the frequency domain allocation for SL CSI-RS (e.g., frequDomainAllocationCSIRS-SL). In one aspect, CSI-RS density of 1 for a set of resource element (RE), port, or a resource block may be supported. ZP-CSIRS may not be supported.

The CSI report may include at least one of channel quality indicator (CQI) or rank indicator (RI). In one aspect, the CQI and RI may be reported together. That is, the receiving UE may generate the CSI report indicating at least the CQI or the RI of the SL-RS and transmit the CSI report to the transmitting UE. The sidelink SL-RS may include zero power ZP SL CSI-RS, NZP SL CSI-RS, SL CSI-IM, SL SRS, SL PRS, etc.

Figure 6:
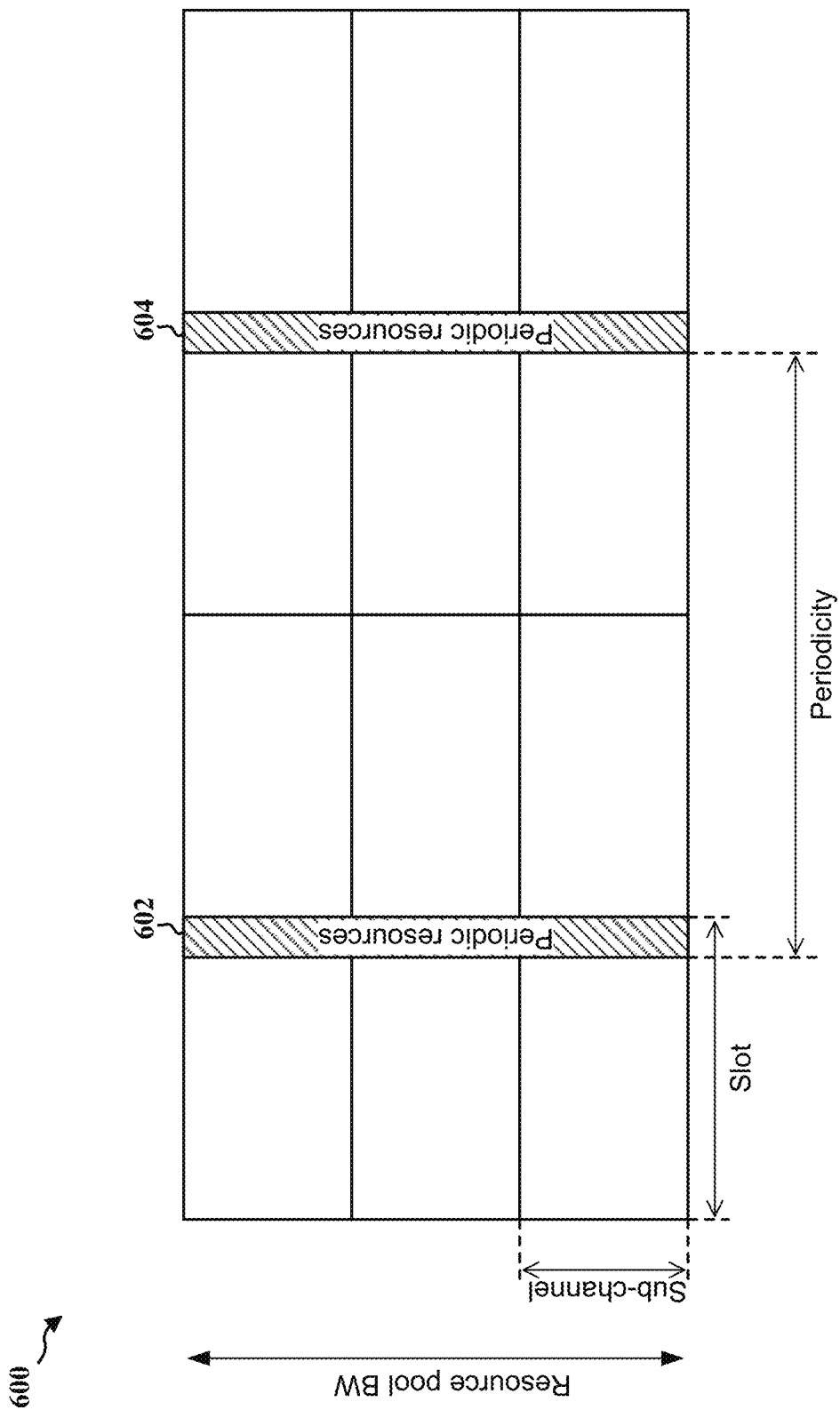
FIG. 6 illustrates an example of resource pool including sidelink reference signal of a method of wireless communication.

FIG. 6 illustrates an example of resource pool 600 including sidelink reference signal of a method of wireless communication. The resource pool 600 may span multiple sub-channels and slots of resources, a first periodic resource 602, and a second periodic resource 604. The first periodic resource 602 and the second periodic resource 604 may be any form of physical resource that is scheduled periodically. The first periodic resource 602 may be a first SL-RS resource 602, and the second periodic resource 604 may be a second SL-RS resource 604. The size of the resource pool 600 in FIG. 6 is merely to illustrate the concept, and the aspects presented herein may be applied to a resource pool spanning two sub-channels or more than three sub-channels, as well as a resource pool spanning fewer or more slots than illustrated in the example in FIG. 6.

In one aspect, the SL-RS may have the same bandwidth as the PSSCH. If the bandwidth of the SL-RS is limited to a bandwidth of the PSSCH, the SL-RS is not a wideband RS, and the transmission of the SL-RS may be tied to the PSSCH. That is, the SL-RS may be limited to the PSSCH communicated between the transmitting UE and the receiving UE of the sidelink communication, and the receiving UE of the sidelink communication may transmit the CSI report to the transmitting UE based on the PSSCH received from the transmitting UE. Accordingly, the transmitting UE and the receiving UE may estimate the channel state of the part of the resource pool, e.g., sub-channel that corresponds with the PSSCH and not the part of the resource pool that does not correspond to the sub-channel of the PSSCH.

In some aspects, the SL-RS resources 602 and 604 may be a standalone RS and/or a wideband RS. Here, the standalone SL-RS may refer to the SL-RS configured separate from or independent of the PSSCH. That is, the BW of SL-RS transmitted by a UE may be independent of the BW of the PSSCH transmitted by the UE. The transmission of a SL-RS may also be independent of the transmission of the PSSCH or any other physical channels. In one aspect, the SL-RS resources 602 and 604 may be the standalone RS that the SL-RS resources 602 and 604 are not limited to the bandwidth of PSSCH. In another aspect, the SL-RS resources 602 and 604 may be wideband, e.g., extending over more than one sub-channel. In one aspect, the bandwidth of the SL-RS resources 602 and 604 may span the bandwidth of the resource pool 600.

A set of REs, symbols, or slots may be assigned for the SL-RS transmission, and some resources, at least one of the REs, the symbols or the slots, may be assigned for the SL-RS transmission and reception. That is, a set of resource, such as the REs, symbols, or slots may be assigned for the SL-RS transmission and reception separately from the PSSCH.

The configuration of the SL-RS resources 602 and 604 for the transmission or the reception of the SL-RS may have a periodicity, and the SL-RS resources may be available at a given period. The configuration may be provided per resource pool, and each UE communicating on the resource pool may be aware of the configuration of the standalone SL-RS. Accordingly, the UEs communicating on the resource pool may rate-match corresponding sidelink transmissions or receptions around the SL-RS resources 602 and 604 to avoid the overlap. In some aspects, rate-matching for reception may be referred to as de-rate matching to receive data that has been rate-matched prior to transmission. Here, the rate-matching may refer to a process of match the number of resources in transport block (TB) to the number of resources that can be transmitted in the given resource pool. As the sidelink transmission or reception of the sidelink communication may not overlap with the SL-RS resources 602 and 604 configured for the transmission or the reception of the SL-RS, the UE may rate-match around the SL-RS resources. The PSSCH may be multiplexed with the SL-RS resources 602 and 604 by rate-matching the PSSCH around the SL-RS and the UEs communicating on the resource pool on the PSSCH may rate-match the sidelink transmissions or receptions around the set of resources of the multiplexed PSSCH and the SL-RS.

In one aspect, physical sidelink feedback channel (PSFCH) resources may be provided and associated with a periodicity. FIG. 2 illustrates an example of a slot having PSFCH resources. The PSFCH may be enabled on the resource pool, and the PSFCH may have a periodicity of 1, 2, or 4 slots. That is, the PSFCH may be configured at the end of corresponding slot, and the PSFCH periodicity of the PSFCH may be one of 1, 2, or 4 slots.

In some aspects, the periodic resources for the standalone SL-RS may be multiplexed with the periodic resources for the PSFCH within the same resource pool. That is, the UEs communicating via the sidelink communication may share the configuration to multiplex the PSFCH and the SL-RS, and schedule the sidelink transmissions including the PSCCH and the PSSCH around the resources for the PSFCH and the SL-RS. Furthermore, the support for standalone SL-RS and the rate-matching behavior may be optional and at least one UE may not support the features of the standalone SL-RS and the rate-matching of the sidelink transmissions around the PSFCH and the SL-RS.

The UEs communicating via the sidelink communication may include one or more UEs that do not support features associated with the standalone SL-RS. The sidelink communication may be configured by a base station, and the UEs that support the standalone SL-RS and the at least one UE that does not support the standalone SL-RS may schedule the sidelink communications on the resource pool based on one or more sidelink configurations received from the base station.

Figure 7:
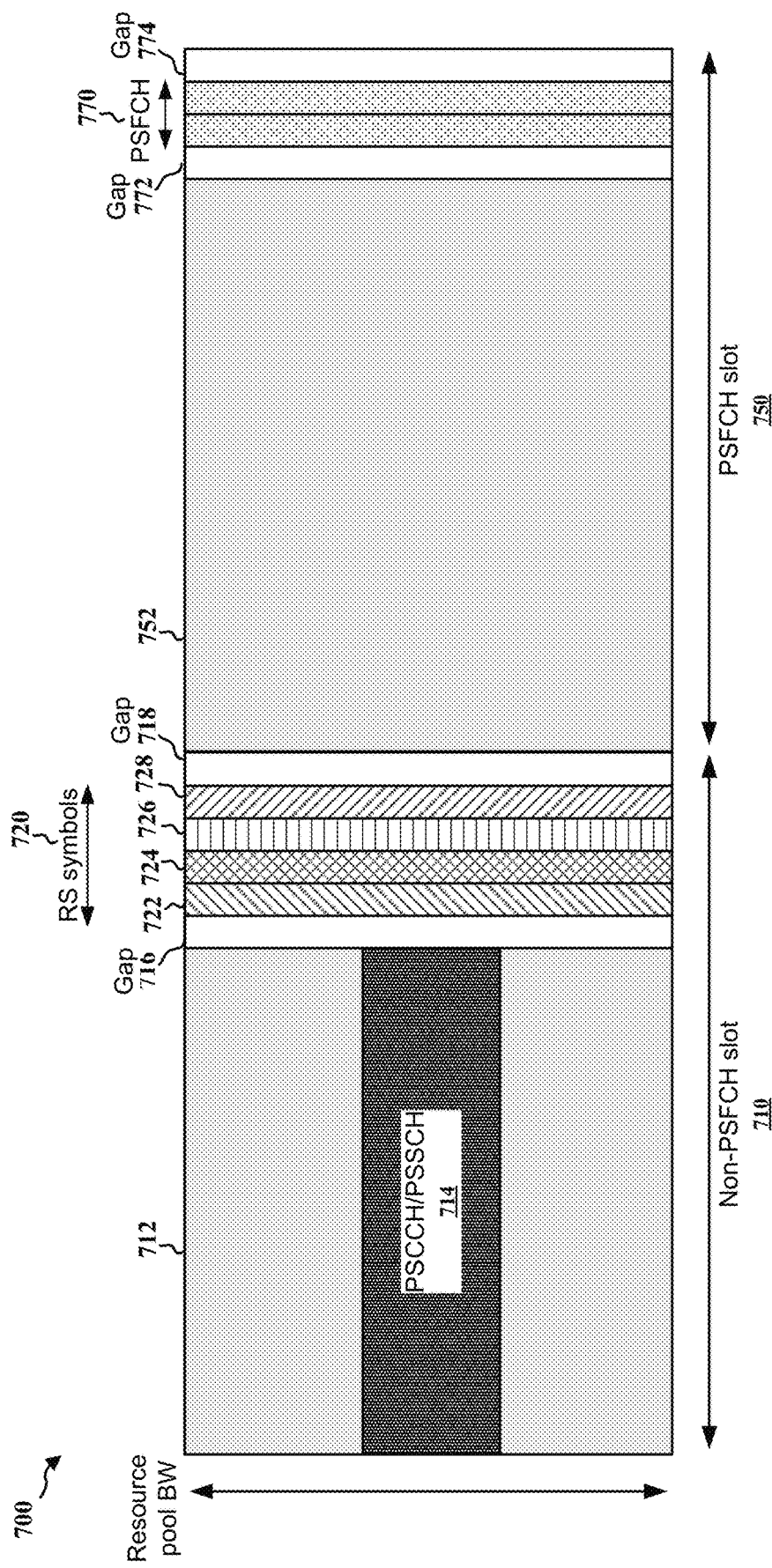
FIG. 7 illustrates an example of sidelink communication of a method of wireless communication.

FIG. 7 illustrates a first example 700 of rate-matching sidelink communication of a method of wireless communication. The first example 700 of the rate-matching sidelink communication may include a non-PSFCH slot 710 and a PSFCH slot 750. The non-PSFCH slot 710 may refer to a slot that does not include PSFCH 770 and the PSFCH slot 750 may refer to a slot that includes PSFCH 770.

The non-PSFCH slot 710 may include a first set of resources 712 that the sidelink UEs may schedule the PSCCH and/or the PSSCH 714, the RS symbols 720, and gaps 716 and 718 at respective sides of the RS symbols 720. The RS symbols 720 may include a plurality of SL-RS, including first SL-RS 722, second SL-RS 724, third SL-RS 726, and fourth SL-RS 728. In one aspect, the first SL-RS 722, the second SL-RS 724, the third SL-RS 726, and the fourth SL-RS 728 may have different patterns. In another aspect, the first SL-RS 722, the second SL-RS 724, the third SL-RS 726, and the fourth SL-RS 728 may be repetition of same RS or a set of RSs. The first example 700 illustrates that the plurality of SL-RS includes four SL-RSs, but the examples of the current disclosure are not limited thereto, and the RS symbols 720 may include any applicable number of SL-RSs. Furthermore, the example 700 illustrates that each SL-RS are carried per symbols, but the examples of the current disclosure are not limited thereto, and the RS symbols 720 may include a number of SL-RS allocated for a set of REs.

The PSFCH slot 750 may include a second set of resources 752 that the sidelink UEs may schedule the PSCCH/PSSCH, the PSFCH 770, and a first PSFCH gap 772 and a second PSFCH gap 774 on respective sides of the PSFCH 770. The first example 700 illustrates that two symbols are allocated for the PSFCH 770, but the examples of the current disclosure are not limited thereto, and the PSFCH 770 may be configured with any number of symbols applicable.

In some aspects, the PSFCH and the SL-RS may be configured with the same periodicity, and the PSFCH and the SL-RS may further be configured with a shifted pattern. That is, the RS symbols 720 and the PSFCH 770 may have the same periodicity with a shifted pattern to occur in different slots, such as alternating slots.

The RS symbols 720 and the PSFCH 770 may be configured to not occur within the same slot. Accordingly, the RS symbols 720 and the PSFCH 770 may not overlap with each other. That is, the transmitting UE may transmit the SL-RS at the same periodicity as the PSFCH with a shifted pattern, and the receiving UE may receive the SL-RS without overlapping with the PSFCH.

The first example 700 shows that the PSFCH 770 may have a periodicity of 2 slots, and the RS symbols 720 carrying the SL-RS may have a periodicity of 2 slots, and the two patterns may be shifted by 1 slot, Accordingly, the RS symbols 720 carrying the SL-RS may consistently be allocated within the non-PSFCH slot 710. Therefore, the RS symbols 720 carrying the SL-RS and the PSFCH 770 may be configured on different slots, and the RS symbols 720 carrying the SL-RS and the PSFCH 770 may overlap with each other. The UEs communicating via the resource pool of the sidelink may expect that the RS symbols 720 carrying the SL-RS and the PSFCH 770 do not overlap with each other.

The first example 700 provides a solution that links or associates the configuration of PSFCH and the SL-RS resources. However, if the RS symbols 720 carrying the SL-RS and/or the PSFCH 770 are configured with a periodicity of 1 slot, the first example 700 may not be implemented. In other aspects, the example described in connection with FIG. 7 may limit the PSFCH and the SL-RS from being configured with a periodicity of 1 slot.

Figure 8:
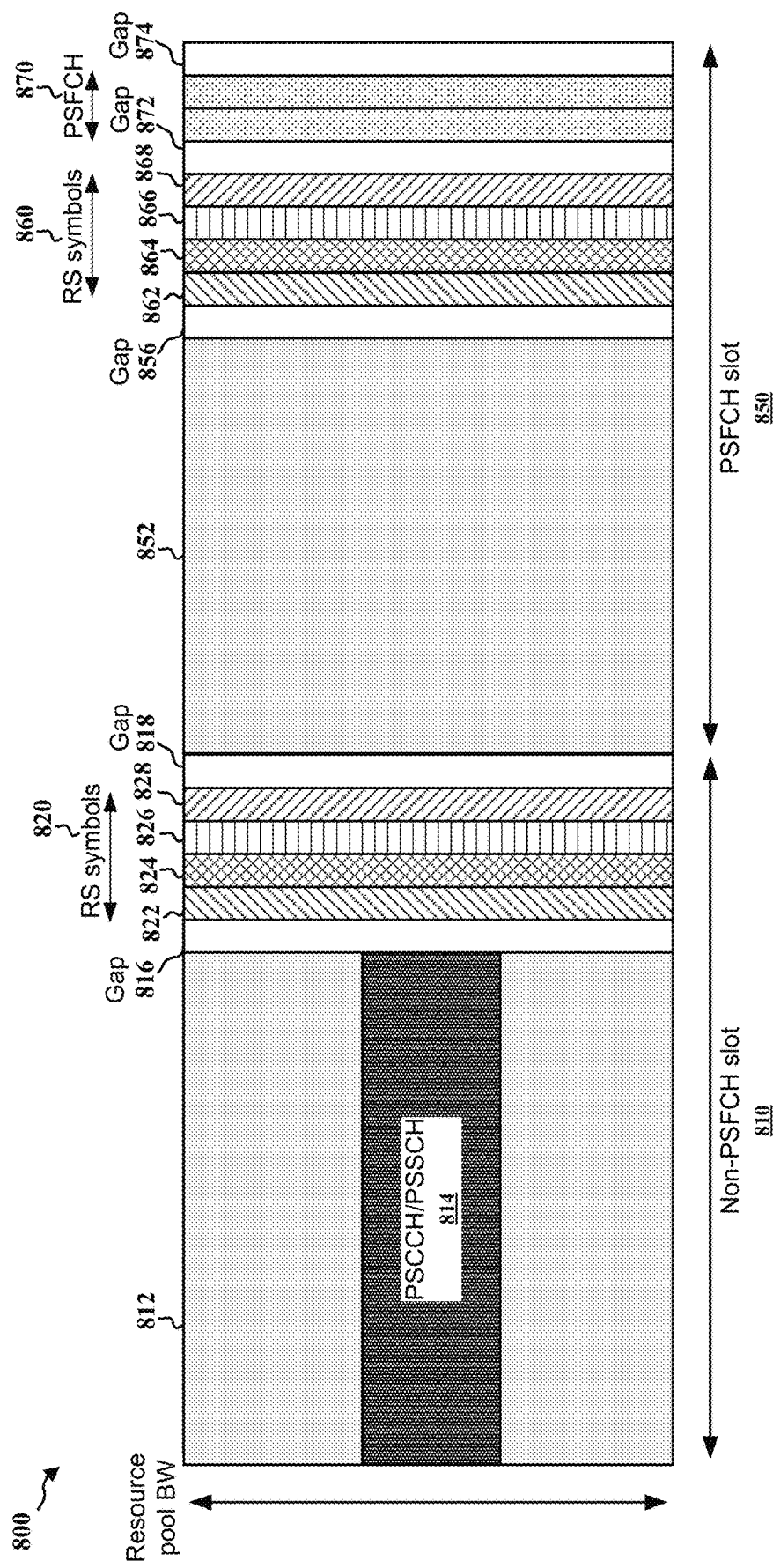
FIG. 8 illustrates an example of sidelink communication of a method of wireless communication.

FIG. 8 illustrates an example 800 of sidelink communication in which SL-RS resources in a slot containing PSFCH resources are adjusted to avoid an overlap. The second example 800 of the rate-matching sidelink communication may include a non-PSFCH slot 810 and a PSFCH slot 850. The non-PSFCH slot 810 may refer to a slot that does not include PSFCH 870 and the PSFCH slot 850 may refer to a slot that includes PSFCH 870.

The non-PSFCH slot 810 may include a first set of resources 812 that the sidelink UEs may schedule the PSCCH and/or the PSSCH 814, the RS symbols 820, and gaps 816 and 818 at respective sides of the RS symbols 820. The RS symbols 820 may include a plurality of SL-RS, including first SL-RS 822, second SL-RS 824, third SL-RS 826, and fourth SL-RS 828. In one aspect, the first SL-RS 822, the second SL-RS 824, the third SL-RS 826, and the fourth SL-RS 828 may have different patterns. In another aspect, the first SL-RS 822, the second SL-RS 824, the third SL-RS 826, and the fourth SL-RS 828 may be repetition of same RS or a set of RSs. The second example 800 illustrates that the plurality of SL-RS includes four SL-RSs, but the examples of the current disclosure are not limited thereto, and the RS symbols 820 may include any applicable number of SL-RSs. Furthermore, the example 800 illustrates that each SL-RS may be carried per symbol, but the examples of the current disclosure are not limited thereto, and the RS symbols 820 may include a number of SL-RS allocated for a set of REs.

The PSFCH slot 850 may include a second set of resources 852 that the sidelink UEs may schedule the PSCCH/PSSCH, the RS symbols 860, and a gap 856 between the first set of resource 852 the RS symbols 860, the PSFCH 870, and a first PSFCH gap 872 and a second PSFCH gap 874 on respective sides of the PSFCH 870. The second example 800 illustrates that two symbols are allocated for the PSFCH 870, but the examples of the current disclosure are not limited thereto, and the PSFCH 870 may be configured with any number of symbols applicable.

In some aspects, the RS resources carrying the SL-RS may be shifted in time in the PSFCH slots. That is, to avoid collision of the RS symbols 860 and the PSFCH 870 within the PSFCH slot 850, the RS symbols 860 may be shifted in a time-domain to avoid the RS symbols 860 from overlapping in time with the PSFCH 870 and the first and second gaps 872 and 874. Accordingly, the RS symbols 820 and the PSFCH 870 may not overlap with each other. That is, the transmitting UE may shift the RS symbols 860 in the time-domain within the PSFCH slot 850 to avoid the RS symbols 860 from colliding with the PSFCH 870 in the PSFCH slot 850, and the receiving UE may receive the SL-RS in the RS symbols 860 not overlapping with the PSFCH 870.

In one aspect, the second example 800 illustrates that the RS symbols 820 and 860 have a periodicity of one slot, and the PSFCH 870 has a periodicity of two slots. Therefore, for every two slots, the RS symbols 860 allocated in the PSFCH slot 850 may overlap with the PSFCH 870 and the first and second gaps 872 and 874. The RS symbols 860 may include a plurality of SL-RS, including first SL-RS 862, second SL-RS 864, third SL-RS 866, and fourth SL-RS 868, and the RS symbols 860 may be shifted by four symbols to avoid the RS symbols 860 from overlapping with the PSFCH 870 and the first and second gaps 872 and 874.

In another aspect, the PSFCH resources may be shifted in a time-domain. If the PSFCH 870 is shifted in time, the UEs that lacks the capabilities to support the standalone SL-RS may not be configured on the same resource pool to communicate.

If the RS resources are shifted in time, some of the RS resources may fall outside of the slot boundary or may be overlapping with resources for PSCCH, DMRS symbols or other physical channels. The RS resources that fall outside the slot boundary or overlap with the resources for PSCCH, DMRS symbols or other physical channels may be assumed to be unavailable, or treated as unavailable, by the UEs. Accordingly, the transmitting UE may not transmit the SL-RS in the shifted RS resources that falls outside the slot boundary or overlap with the resources for PSCCH, DMRS symbols or other physical channels.

In some aspects, the time shifting of the RS resources may be configured by the base station. That is, the base station may configure the time shifting of the RS resources in the PSFCH slots, and transmit the sidelink configuration including RS configurations to the UEs communicating on the resource pool. The UEs communicating on the resource pool may shift the RS resources in the PSFCH slots in the time-domain based on the sidelink configuration received from the base station.

In one aspect, the sidelink configuration received from the base station may include one RS configuration that may be applied to both the PSFCH slots and the non-PSFCH slots. That is, the RS configuration received from the base station may indicate the same configuration for the RS resources in the PSFCH slots and the non-PSFCH slots. The UEs communicating on the resource pool via the sidelink communication share the same configuration for the PSFCH resources (i.e., PSFCH configuration), and the UEs may each shift the RS resources in the PSFCH slots based on the RS configuration and the PSFCH configuration. For example, when RS is scheduled in the PSFCH slot, the UE may shift the RS resources by x symbols to the left (x is a natural number). When shifting, the gap symbols may be maintained and the shifted resources may not overlap with the gap symbols within a slot as well.

For example, in the second example 800, the sidelink configuration received from the base station may include the RS configuration indicating that the RS symbols 820 are configured at the last four symbols of each slots, and the PSFCH 870 and the first and second gaps 872 and 874 are configured at the last four symbols of the PSFCH slot. Accordingly, the UEs communicating on the resource pool may understand that the RS symbols 860 in the PSFCH slot 850 are to be shifted in the time-domain by four symbols, corresponding to the PSFCH 870 and the first and second gaps 872 and 874 configured at the last four symbols of the PSFCH slot 850.

In another aspect, the sidelink configuration received from the base station may include at least two RS configurations including a first RS configuration that may be applied to the non-PSFCH slots and a second RS configuration that may be applied to the PSFCH slots. That is, the RS configuration received from the base station may indicate the first configuration for the RS resources in the non-PSFCH slots and the second configuration for the RS resources in the PSFCH slots. The UEs communicating on the resource pool via the sidelink communication may configure the RS resources in the non-PSFCH slots based on the first RS configuration and the RS resources in the PSFCH slots based on the second RS configuration.

For example, in the second example 800, the sidelink configuration received from the base station may include a first RS configuration indicating that the RS symbols 820 in the non-PSFCH slot 810 are configured at the last four symbols of the non-PSFCH slot 810, a second RS configuration indicating that the RS symbols 860 in the PSFCH slot 850 are configured at a set of resources shifted in the time-domain by four symbols from the last four symbols of the PSFCH slot 850. The base station may determine the second RS configuration based on the first RS configuration and the PSFCH configuration to avoid the RS symbols 860 from overlapping with the PSFCH 870. Accordingly, the UEs communicating on the resource pool may transmit and receive the SL-RS carried on the RS symbols 860 in the PSFCH slot 850 that do not overlap with the PSFCH 870 and the first and second gaps 872 and 874 configured at the last four symbols of the PSFCH slot 850.

Figure 9:
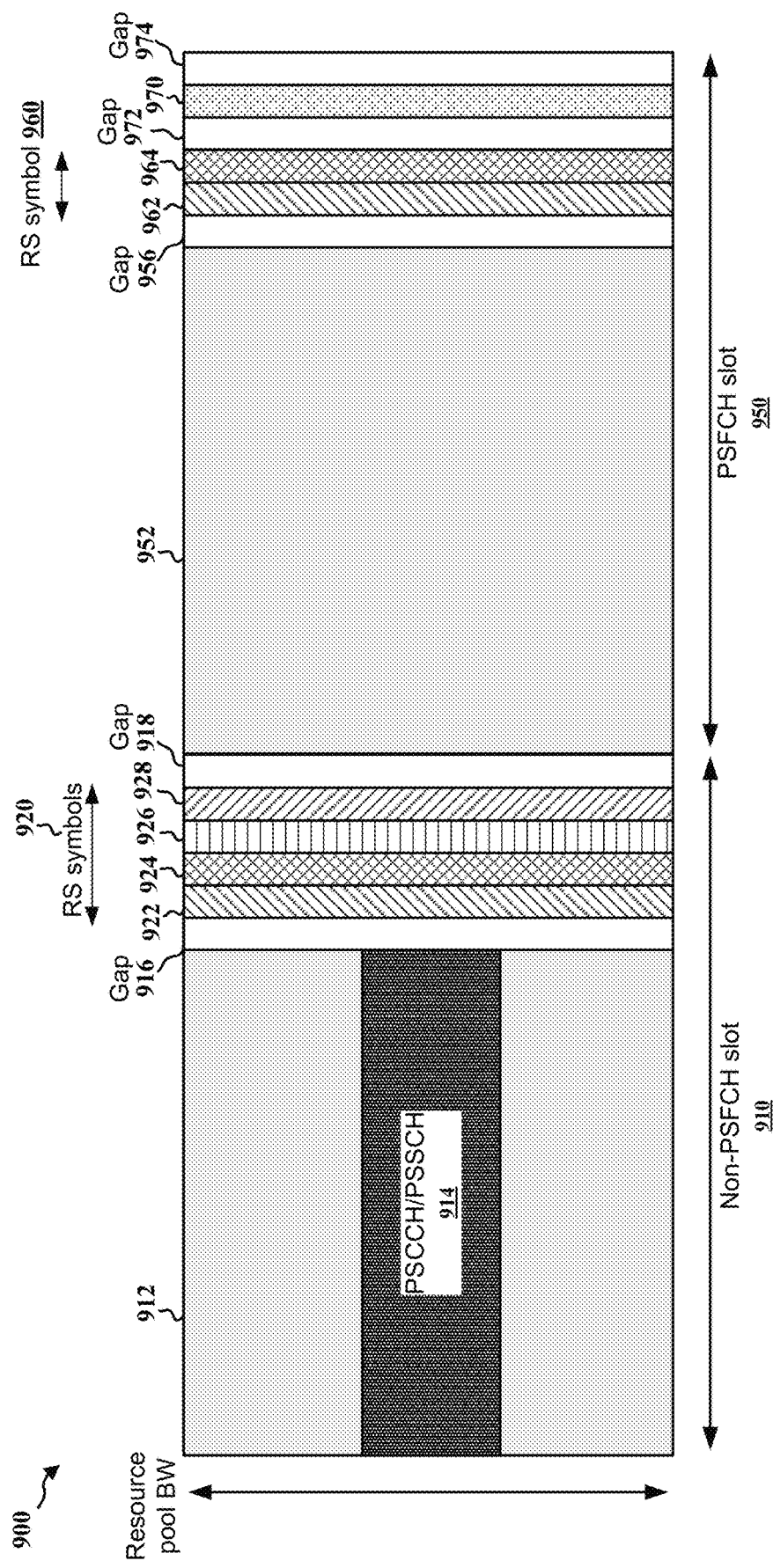
FIG. 9 illustrates an example of sidelink communication of a method of wireless communication.

FIG. 9 illustrates an example 900 of sidelink communication. The third example 900 of the rate-matching sidelink communication may include a non-PSFCH slot 910 and a PSFCH slot 950. The non-PSFCH slot 910 may refer to a slot that does not include PSFCH 970 and the PSFCH slot 950 may refer to a slot that includes PSFCH 970.

The non-PSFCH slot 910 may include a first set of resources 912 that the sidelink UEs may schedule the PSCCH and/or the PSSCH 914, the RS symbols 920, and gaps 916 and 918 at respective sides of the RS symbols 920. The RS symbols 920 may include a plurality of SL-RS, including first SL-RS 922, second SL-RS 924, third SL-RS 926, and fourth SL-RS 928. In one aspect, the first SL-RS 922, the second SL-RS 924, the third SL-RS 926, and the fourth SL-RS 928 may have different patterns. In another aspect, the first SL-RS 922, the second SL-RS 924, the third SL-RS 926, and the fourth SL-RS 928 may be repetitions of the same RS or a set of RSs. The third example 900 illustrates that the plurality of SL-RS includes four SL-RSs, but the examples of the current disclosure are not limited thereto, and the RS symbols 920 may include any applicable number of SL-RSs. Furthermore, the example 900 illustrates that each SL-RS is carried per symbols, but the examples of the current disclosure are not limited thereto, and the RS symbols 920 may include a number of SL-RS allocated for a set of REs.

The PSFCH slot 950 may include a second set of resources 952 that the sidelink UEs may schedule the PSCCH/PSSCH, the RS symbols 960, and a gap 956 between the first set of resource 952 the RS symbols 960, the PSFCH 970, and a first PSFCH gap 972 and a second PSFCH gap 974 on respective sides of the PSFCH 970. The third example 900 illustrates that one symbol is allocated for the PSFCH 970, but the examples of the current disclosure are not limited thereto, and the PSFCH 970 may be configured with any number of symbols applicable.

In some aspects, the RS resources configured to overlap with the PSFCH and the first and second gaps within the PSFCH slots may be considered unavailable. That is, if a part of the plurality of SL-RS of the RS resources configured in the PSFCH slot overlaps with the PSFCH or the first and second gaps disposed at respect sides of the PSFCH, the part of the RS resources that collides with the PSFCH slot overlaps with the PSFCH or the first and second gaps may be canceled or dropped. Accordingly, the transmitting UE may transmit the SL-RS in the resources that do not overlap with the PSFCH within the PSFCH slot, and the receiving UE may expect to receive the SL-RS in the resources that do not overlap with the PSFCH. Because the PSFCH and the first and second gaps may be configured at the end of the PFSCH slot, the RS resources from the end may be dropped instead of dropping the RS resources from the beginning.

The third example 900 illustrates that, the RS symbols 920 and 960 have a periodicity of one slot, and the PSFCH 970 has a periodicity of two slots. Therefore, for every two slots, the RS symbols 960 allocated in the PSFCH slot 950 may overlap with the PSFCH 970 and the first and second gaps 972 and 974. The RS symbols 960 may include a plurality of SL-RS, including first SL-RS 962, second SL-RS 964, third SL-RS, and fourth SL-RS, and the third SL-RS and the fourth SL-RS may overlap with the PSFCH 970 and the first and second gaps 972 and 974. Therefore, the third SL-RS and the fourth SL-RS of the RS symbols 960 may be treated as unavailable, and the RS symbols 960 may be transmitted with the first SL-RS 962 and the second SL-RS 964. Accordingly, the RS symbols 960 including the first SL-RS 962 and the second SL-RS 964 may avoid overlapping with the PSFCH 970 and the first and second gaps 972 and 974.

Here, the PSFCH 970 and the first and second gaps 972 and 974 may be configured at the end of the PFSCH slot 950, the second SL-RS, the third SL-RS, and the fourth SL-RS of the RS symbol 960 may be dropped, instead of dropping resources from the beginning of the SL-RS resources.

In some aspects, the UEs configured to communicate on the resource pool may rate-match the PSSCH transmissions around the SL-RS resources that are configured for a resource pool. That is, the UEs exchanging sidelink communication with resources from a particular resource pool may consider the SL-RS to be multiplexed with the PSFCH and rate-match around the resources of the SL-RS and the PSSCH in a manner than avoids overlapping or colliding resources of the SL-RS multiplexed with the PSFCH. However, if UEs with different capabilities are configured on the same resource pool, the UEs that do not support the SL-RS may not successfully rate-match the PSCCH around the SL-RS, and the sidelink transmission may overlap or collide between the UEs. That is, the UEs that are configured to communicate on the resource pool may include a first set of UEs that has the capability to support the SL-RS and multiplexing of the SL-RS with the PSFCH and rate-matching the PSSCH around the multiplexed SL-RS and PSFCH and a second set of UEs that lacks the capability to support the SL-RS and rate-matching the PSSCH around the multiplexed SL-RS and PSFCH. In such a case, the second set of UEs may not understand the configuration of the SL-RS, and the transmission and the reception of the PSSCH without rate-matching with the SL-RS may not be successful. Also, the SL-RS and the SL CSI reporting may be supported for unicast. The UEs may indicate the capability of the UE to the base station during the PC5 link setup.

The base station may receive the UE capabilities from the UEs during the PC5 link setup and identify the first set of UEs with the capability to support the SL-RS and multiplexing of the SL-RS with the PSFCH and the second set of UEs that lacks the capability to support the SL-RS and rate-matching the PSSCH around the multiplexed SL-RS and PSFCH. Accordingly, the base station may configure a first set of slots and a second set of slots within the resource pool, e.g., the first set of slots for the first set of UEs and the second set of slots for the second set of UEs. The first set of slots and the second set of slots may be configured mutually exclusive so that the UEs with different capabilities.

Figure 10:
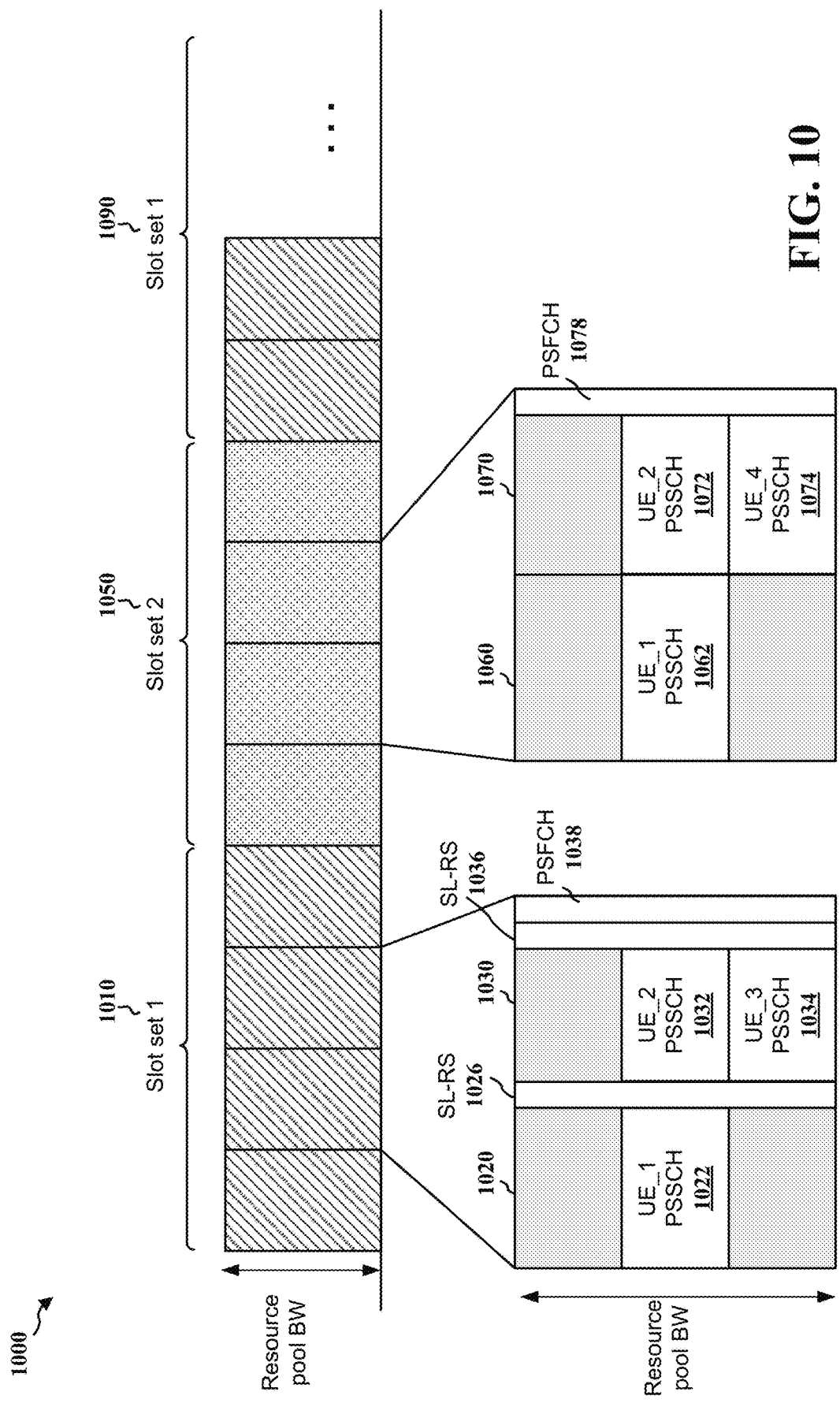
FIG. 10 illustrates an example of sidelink communication of a method of wireless communication.

FIG. 10 illustrates a fourth example 1000 of sidelink communication of a method of wireless communication. The fourth example 1000 of sidelink communication shows the resource pool including first sets of slots 1010 and 1090 and a second set of slots 1050. The fourth example 1000 illustrates that each of the first set of slots 1010 and 1090 and the second set of slots 1050 includes four slots. However, the examples of the current disclosure are not limited thereto, and each set of slots may include any number of slots applicable. The first set of slots 1010 and the second set of slots 1050 may be configured with different numbers of slots. For example, the first set of slots may include eight slots and the second set of slots may include four slots. The first set of slots and the second set of slots may be mutually exclusive.

The fourth example 1000 illustrates that the slots in the first set of slots 1010 may be the RS slots and be configured to the UEs supporting the SL-RS and rate-matching the PSSCH around the multiplexed SL-RS and PSFCH, and the slots in the second set of slots 1050 may be the non-RS slots and be configured for all UEs. The slots in the first set of slots 1010 may be used for unicast communication across the UEs with the capability to support the SL-RS and rate-matching the PSSCH around the multiplexed SL-RS and PSFCH. The slots in the second set of slots 1050 may be used for the unicast communication with UEs not supporting the capability to support the SL-RS and rate-matching the PSSCH around the multiplexed SL-RS and PSFCH, or the groupcast and/or broadcast communications.

The first set of UEs that has the capability to support the SL-RS and multiplexing of the SL-RS with the PSFCH and rate-matching the PSSCH around the multiplexed SL-RS and PSFCH may be specified at the first set of UEs or configured by the base station to communicate via the sidelink transmission using the first set of slots and the second set of slots. In one aspect, the first set of UEs that has the capability to support the SL-RS and multiplexing of the SL-RS with the PSFCH and rate-matching the PSSCH around the multiplexed SL-RS and PSFCH may be specified with a configuration to communicate via the sidelink transmission using the first set of slots and the second set of slots. In another aspect, the first set of UEs that has the capability to support the SL-RS and multiplexing of the SL-RS with the PSFCH and rate-matching the PSSCH around the multiplexed SL-RS and PSFCH may receive an instruction from the base station directly or via a relaying UE that configures the first set of UEs to communicate via the sidelink transmission using the first set of slots and the second set of slots. Also, the sidelink configuration may be provided or specified per resource pool. Particularly, the first set of UES may use the first set of slots to transmit unicast sidelink communications with the SL-RS, and the first set of UEs may use the second set of slots to transmit the unicast, the groupcast and/or the broadcast sidelink communications without the SL-RS. The second set of UEs that lacks the capability to support the SL-RS and rate-matching the PSSCH around the multiplexed SL-RS and PSFCH may be configured by the base station to communicate via the sidelink transmission using the second set of slots.

A transmission profile may be provided to map the services specified with groupcast and broadcast sidelink communications to the second set of slots. For unicast sidelink communications, the configuration may rely on the capability information of each UEs to select resources between both the first set of slots and the second set of slots or the second set of slots. A higher layer signaling may be provided to indicate which set(s) of slots may be used by the physical layer when performing resource selections.

In one example, the first set of slots 1010 may include four slots. The second slot of the first set of slots 1010 may include SL-RS 1026 and a set of resources 1020 for PSCCH/PSSCH rate-matched around the SL-RS 1026, and the third slot of the first set of slots 1010 may include SL-RS 1036, a PSFCH 1038, and a set of resources 1030 for PSCCH/PSSCH rate-matched around the SL-RS 1036 and the PSFCH 1038. Here, the UEs may include a first UE, a second UE, and a third UE that have the capability to support the SL-RS and rate-matching the PSSCH around the multiplexed SL-RS and PSFCH. Accordingly, the first UE may transmit the PSSCH 1022 in the set of resources 1020, and the second UE may transmit the PSSCH 1032 and the third UE may transmit the PSSCH 1034 in the set of resources 1030.

In another example, the second set of slots 1050 may include four slots. In contrast to the first set of slots 1010, the slots in the second set of slots 1050 are not configured with the SL-RS. The second slot of the second set of slots 1050 may include a set of resources 1060 for PSCCH/PSSCH, and the third slot of the second set of slots 1050 may include a PSFCH 1078 and a set of resources 1070 for PSCCH/PSSCH. Here, the UEs may include a first UE and a second UE that have the capability to support the SL-RS and rate-matching the PSSCH around the multiplexed SL-RS and PSFCH, and a fourth UE that do not have the capability to support the SL-RS and rate-matching the PSSCH around the multiplexed SL-RS and PSFCH. Accordingly, the first UE may transmit the PSSCH 1062 in the set of resources 1060, and the second UE may transmit the PSSCH 1072, and the fourth UE may transmit the PSSCH 1074 in the set of resources 1070. For example, the PSSCH 1062 of the first UE and the PSSCH 1072 of the second UE may be for the groupcast and/or the broadcast communications.

In one aspect, a configuration of the resource pool dedicated to the UEs that support the SL-RS and multiplexing of the SL-RS with the PSFCH may be specified at the UE and/or the base station that may support the SL-RS and multiplexing of the SL-RS with the PSFCH. In another aspect, the base station may configure the resource pool that is dedicated to the UEs that support the SL-RS and multiplexing of the SL-RS with the PSFCH. In another aspect, the configuration of the resource pool dedicated to the UEs that support the SL-RS and multiplexing of the SL-RS with the PSFCH may be received from the base station via a relaying UE. Also, the sidelink configuration may be provided or specified per resource pool. Thus, the UEs that support the SL-RS and multiplexing of the SL-RS with the PSFCH may exchange communication using the resource pool and other UEs that do not support the capability may not use the resource pool.

Figure 11:
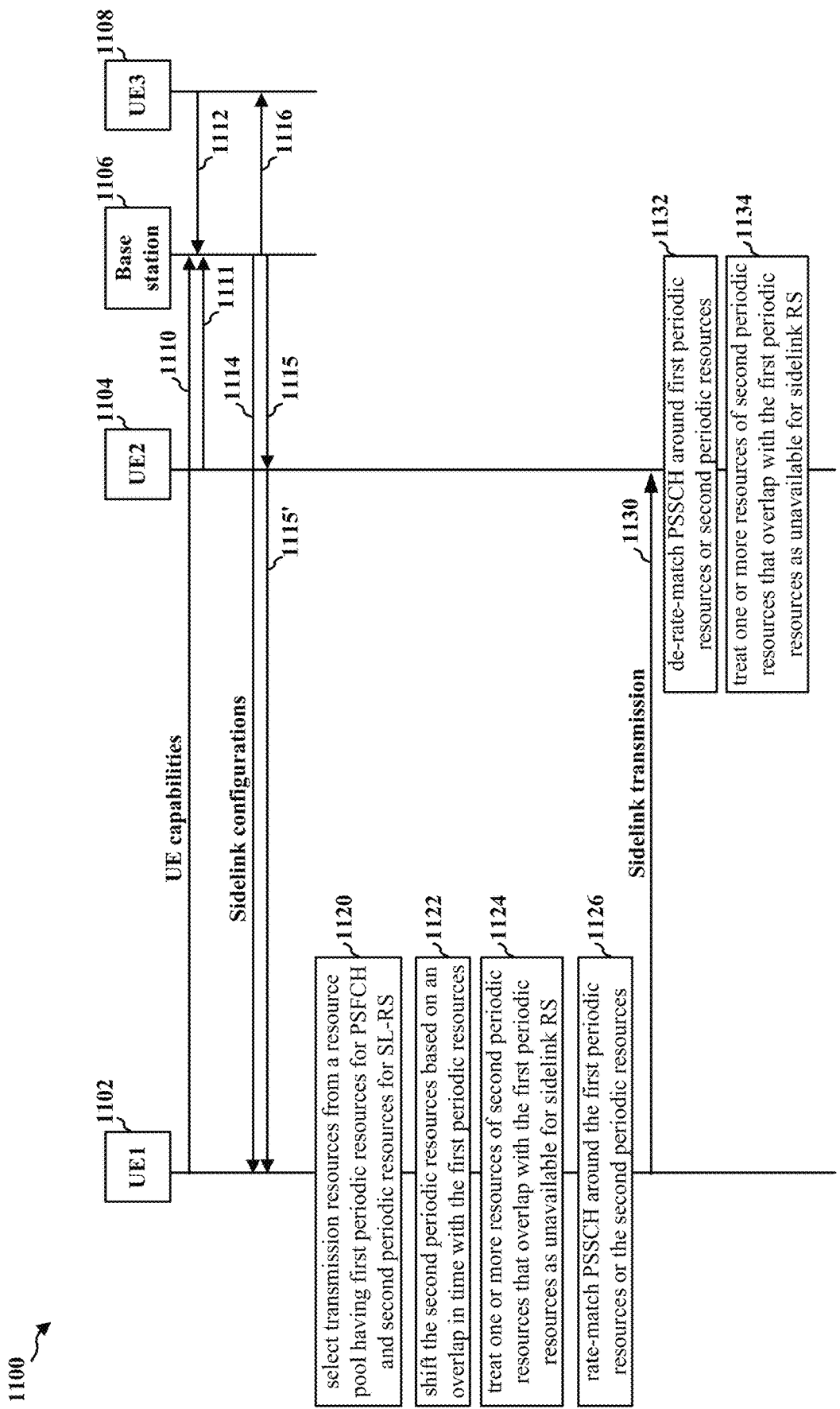
FIG. 11 is a call-flow diagram of a method of wireless communication.

FIG. 11 is a call-flow diagram 1100 of a method of wireless communication. The call-flow diagram 1100 may include a first UE 1102, a second UE 1104, a base station 1106 and a third UE 1108. Here, the first UE 1102, the second UE 1104, and the third UE 1108 may be configured by the base station 1106 to communicate PSSCH on the resource pool. The first UE 1102 and the second UE 1104 may have the capabilities to support the SL-RS and rate-matching the PSSCH around the multiplexed SL-RS and PSFCH, and the third UE 1108 may not have the capability to support the SL-RS and rate-matching the PSSCH around the multiplexed SL-RS and PSFCH. Here, the first UE 1102 may be the transmitting UE and the second UE 1104 may be the receiving UE.

At 1110, the first UE 1102 may transmit a UE capability of the first UE 1102 to the base station 1106, the UE capability indicating support of the first UE 1102 for at least one SL-RS. The base station 1106 may receive the UE capability from the first UE 1102, the UE capability indicating support of the first UE 1102 for at least one SL-RS. The UE capability of the first UE 1102 may indicate that the first UE 1102 has the capability to support the SL-RS and rate-matching the PSSCH around the multiplexed SL-RS and PSFCH.

At 1111, the second UE 1104 may transmit a UE capability of the second UE 1104 to the base station 1106, the UE capability indicating support of the first UE 1102 for at least one SL-RS. The base station 1106 may receive the UE capability from the second UE 1104, the UE capability indicating support of the second UE 1104 for at least one SL-RS. The UE capability of the second UE 1104 may indicate that the second UE 1104 has the capability to support the SL-RS and rate-matching the PSSCH around the multiplexed SL-RS and PSFCH.

At 1112, the third UE 1108 may transmit a UE capability of the third UE 1108 to the base station 1106, the UE capability indicating support of the third UE 1108 for at least one SL-RS. The base station 1106 may receive the UE capability from the third UE 1108, the UE capability indicating support of the third UE 1108 for at least one SL-RS. The UE capability of the third UE 1108 may indicate that the third UE 1108 do not have the capability to support the SL-RS and rate-matching the PSSCH around the multiplexed SL-RS and PSFCH.

The base station 1106 may determine one or more sidelink configurations based on the UE capabilities received from the first UE 1102, the second UE 1104, and the third UE 1108. The base station 1106 may transmit, to the one or more UEs, sidelink configurations for at least one of the one or more UEs to communicate sidelink transmissions in the resource pool having first periodic resources for at least one of the PSFCH or the gap associated with the PSFCH and second periodic resources for the SL-RS, the sidelink transmissions being rate-matched around at least one of the first periodic resources for the PSFCH or the second periodic resources for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. The sidelink configuration may also indicate a first set of slots of the resource pool for a first set of UEs that support the rate-matching of the sidelink transmission to communicate the SL-RS in the first set of slots, and a second set of slots of the resource pool for a second set of UEs that do not support the rate-matching of the sidelink transmission. The first set of slots may be configured for unicast sidelink transmissions between UEs having the capability to support the rate-matching of the sidelink transmission.

At 1114, the base station 1106 may transmit the sidelink configuration to the first UE 1102. The first UE 1102 may receive, from the base station 1106, the sidelink configuration for the second periodic resources for the SL-RS. The sidelink configuration may instruct the first UE 1102 to allocate a first set of resources in the resource pool for the SL-RS. For example, the resource pool may include a first set of slots including the first periodic resources and the second periodic resources for the sidelink RS and a second set of slots including the first periodic resources but free of the second periodic resources for the sidelink RS. Also, the sidelink configuration may be provided or specified per resource pool. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the rate-matching of the sidelink transmission around at least one of the first periodic resources for the PSFCH or the second periodic resources for the SL-RS. That is, the first UE 1102 may select to use the first set of slots and/or the second set of slots based on a cast type of the sidelink transmission. Also, the first UE 1102 may select to use the first set of slots and/or the second set of slots based on the capability of the first UE 1102 to support the rate-matching of the sidelink transmission around at least one of the first periodic resources for the PSFCH or the second periodic resources for the sidelink RS. The first set of slots may be different than a second set of slots associated with UEs that do not support the rate-matching of the sidelink transmission around at least one of the first periodic resources for the PSFCH or the second periodic resources for the SL-RS.

At 1115, the base station 1106 may transmit the sidelink configuration to the second UE 1104. The second UE 1104 may receive the sidelink configuration for the second periodic resources for the SL-RS, the sidelink configuration allocating the first set of resources in the resource pool for the SL-RS. The sidelink configuration may instruct the second UE 1104 that the first set of resources is allocated in the resource pool for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the de-rate-matching of the sidelink transmission around at least one of the first periodic resources for the PSFCH or the second periodic resources for the SL-RS. The first set of slots may be different than a second set of slots associated with UEs that do not support the rate-matching of the sidelink transmission around at least one of the first periodic resources for the PSFCH or the second periodic resources for the SL-RS.

At 1115', the second UE 1104 may relay, to the first UE 1102, the sidelink configuration for the first UE 1102 received from the base station 1106. That is, the first UE 1102 may receive, via the second UE 1104 as the relay UE, the sidelink configuration for the second periodic resources for the SL-RS from the base station 1106. The sidelink configuration received at 1115' from the base station 1106 via the second UE 1104 may be substantially the same as the sidelink configuration received at 1114.

At 1116, the base station 1106 may transmit the sidelink configuration to the third UE 1108. Here, the third UE 1108 may not have the capability to support the SL-RS and rate-matching the PSSCH around the multiplexed SL-RS and PSFCH, and therefore, the base station 1106 may instruct the third UE 1108 to communicate on the second set of slots of the resource pool.

At 1120, the first UE 1102 may select transmission resources from a resource pool having first periodic resources for at least one of a PSFCH or a gap associated with the PSFCH and second periodic resources for SL-RS. The second periodic resources for the SL-RS may be configured to avoid an overlap, in a time-domain, with the first periodic resources for the PSFCH. In one aspect, the second periodic resources for the SL-RS may have the same periodicity as the second periodic resources for the PSFCH and be configured in different slots than the second periodic resources for the PSFCH.

At 1122, to select the transmission resources from the resource pool, the first UE 1102 may shift, in a time-domain, the second periodic resources for the SL-RS based on an overlap in time with the first periodic resources for the PSFCH. The first set of resources may be shifted, in the time-domain, from the first set of resources by a first number of resources, the first number of resources corresponding to a set of resources carrying at least one of the PSFCH or the associated gap.

At 1124, to select the transmission resources from the resource pool, the first UE 1102 may treat one or more resources of the second periodic resources for the SL-RS that overlap in time with the first periodic resources for the PSFCH as unavailable for the SL-RS.

At 1126, the first UE 1102 may rate-match a sidelink transmission around at least one of the first periodic resources for the PSFCH or the second periodic resources for the SL-RS. That is, the first UE 1102 may rate-match the PSSCH around at least one of the first periodic resources for the PSFCH or the second periodic resources for the SL-RS. In one aspect, a bandwidth of the SL-RS is greater than a bandwidth of the PSSCH. The sidelink transmission may be rate-matched around the second set of resources and the set of resources carrying at least one of the PSFCH or the associated gap.

At 1130, the first UE 1102 may transmit the sidelink transmission. The second UE 1104 may receive the sidelink transmission in the resource pool having the first periodic resources for at least one of the PSFCH or the gap associated with the PSFCH and the second periodic resources for the SL-RS. The sidelink transmission may include at least one of the PSSCH, the PSFCH, or the SL-RS. The sidelink transmission may be communicated on one of the first set of slots or the second set of slots based on at least one of a cast type of the sidelink transmission or the capability to support the rate-matching of the sidelink transmission around at least one of the first periodic resources for the PSFCH or the second periodic resources for the SL-RS, based on the sidelink configuration received at 1114 or 1115'. The first set of slots may be configured for unicast sidelink transmissions between UEs having the capability to support the rate-matching of the sidelink transmission around at least one of the first periodic resources for the PSFCH or the second periodic resources for the SL-RS. The resource pool may also be configured for unicast sidelink transmissions between the first UE 1102 and the second UE 1104 having a capability to support the rate-matching of the sidelink transmission around at least one of the first periodic resources for the PSFCH or the second periodic resources for the SL-RS.

At 1132, the second UE 1104 may de-rate-match the sidelink transmission around at least one of the first periodic resources for the PSFCH or the second periodic resources for the SL-RS. The sidelink transmission may be de-rate-matched around the second set of resources and the set of resources carrying at least one of the PSFCH.

At 1134, the second UE 1104 may treat one or more resources of the second periodic resources for the SL-RS that overlap in time with the first periodic resources for the PSFCH as unavailable for the SL-RS.

Figure 12:
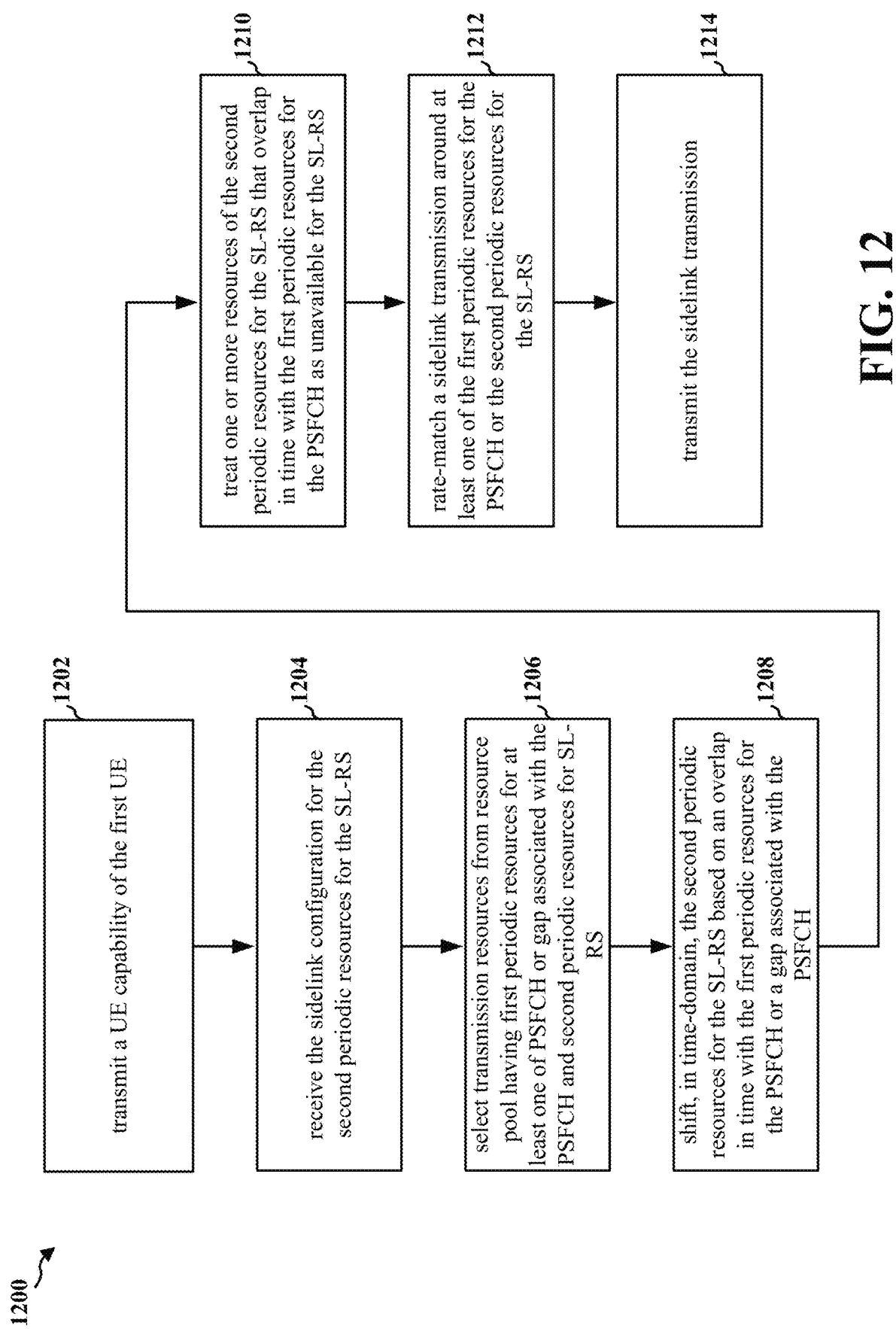
FIG. 12 is a flowchart of a method of wireless communication.

FIG. 12 is a flowchart 1200 of a method of wireless communication. The method may be performed by a UE (e.g., the UE 104; the first UE 1102; the apparatus 1802). The UE may be configured by the base station to communicate the PSSCH on the resource pool. The UE may have the capability to support the SL-RS and rate-matching the PSSCH around the multiplexed SL-RS and PSFCH. Here, the UE may be the transmitting UE.

At 1202, the UE may transmit a UE capability of the UE to the base station, the UE capability indicating support of the UE for at least one SL-RS. The UE capability of the UE may indicate that the UE has the capability to support the SL-RS and rate-matching the PSSCH around the multiplexed SL-RS and PSFCH. For example, at 1110, the first UE 1102 may transmit a UE capability of the first UE 1102 to the base station 1106, the UE capability indicating support of the first UE 1102 for at least one SL-RS. Particularly, 1202 may be performed by a UE capability component 1840.

The base station may determine one or more sidelink configurations based on the UE capabilities received from the UE. The base station may transmit, to the one or more UEs, sidelink configurations for at least one of the one or more UEs to communicate sidelink transmissions in the resource pool having first periodic resources for at least one of the PSFCH or the gap associated with the PSFCH and second periodic resources for the SL-RS, the sidelink transmissions being rate-matched around at least one of the first periodic resources for the PSFCH or the second periodic resources for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. The sidelink configuration may also indicate a first set of slots of the resource pool for a first set of UEs that support the rate-matching of the sidelink transmission to communicate the SL-RS in the first set of slots, and a second set of slots of the resource pool for a second set of UEs that do not support the rate-matching of the sidelink transmission. The first set of slots may be configured for unicast sidelink transmissions between UEs having the capability to support the rate-matching of the sidelink transmission.

At 1204, the UE may receive, from the base station, the sidelink configuration for the second periodic resources for the SL-RS. The sidelink configuration may be received from the base station directly or via a relaying UE. The sidelink configuration may instruct the UE to allocate a first set of resources in the resource pool for the SL-RS. For example, the resource pool may include a first set of slots including the first periodic resources and the second periodic resources for the sidelink RS and a second set of slots including the first periodic resources but free of the second periodic resources for the sidelink RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the rate-matching of the sidelink transmission around at least one of the first periodic resources for the PSFCH or the second periodic resources for the SL-RS. That is, the UE may select to use the first set of slots and/or the second set of slots based on a cast type of the sidelink transmission. Also, the UE may select to use the first set of slots and/or the second set of slots based on the capability of the UE to support the rate-matching of the sidelink transmission around at least one of the first periodic resources for the PSFCH or the second periodic resources for the sidelink RS. The first set of slots may be different than a second set of slots associated with UEs that do not support the rate-matching of the sidelink transmission around at least one of the first periodic resources for the PSFCH or the second periodic resources for the SL-RS. For example, at 1114, first UE 1102 may receive, from the base station 1106, the sidelink configuration for the second periodic resources for the SL-RS. Particularly, 1204 may be performed by a sidelink configuration component 1842.

At 1206, the UE may select transmission resources from a resource pool having first periodic resources for at least one of a PSFCH or a gap associated with the PSFCH and second periodic resources for SL-RS. The second periodic resources for the SL-RS may be configured to avoid an overlap, in a time-domain, with the first periodic resources for the PSFCH. In one aspect, the second periodic resources for the SL-RS may have the same periodicity as the second periodic resources for the PSFCH and be configured in different slots than the second periodic resources for the PSFCH. For example, at 1120, first UE 1102 may select transmission resources from a resource pool having first periodic resources for at least one of a PSFCH or a gap associated with the PSFCH and second periodic resources for SL-RS. Particularly, 1206 may be performed by a resource selection component 1844.

At 1208, to select the transmission resources from the resource pool, the UE may shift, in a time-domain, the second periodic resources for the SL-RS based on an overlap in time with the first periodic resources for the PSFCH or the gap associated with the PSFCH. The first set of resources may be shifted, in the time-domain, from the first set of resources by a first number of resources, the first number of resources corresponding to a set of resources carrying at least one of the PSFCH or the associated gap. For example, at 1122, to select the transmission resources from the resource pool, the first UE 1102 may shift, in a time-domain, the second periodic resources for the SL-RS based on an overlap in time with the first periodic resources for the PSFCH or the gap associated with the PSFCH. Particularly, 1208 may be performed by the resource selection component 1844.

At 1210, to select the transmission resources from the resource pool, the UE may treat one or more resources of the second periodic resources for the SL-RS that overlap in time with the first periodic resources for the PSFCH as unavailable for the SL-RS. For example, at 1124, to select the transmission resources from the resource pool, the first UE 1102 may treat one or more resources of the second periodic resources for the SL-RS that overlap in time with the first periodic resources for the PSFCH as unavailable for the SL-RS. Particularly, 1210 may be performed by the resource selection component 1844.

At 1212, the UE may rate-match a sidelink transmission around at least one of the first periodic resources for the PSFCH or the second periodic resources for the SL-RS. That is, the UE may rate-match the PSSCH around at least one of the first periodic resources for the PSFCH or the second periodic resources for the SL-RS. In one aspect, a bandwidth of the SL-RS is greater than a bandwidth of the PSSCH. The sidelink transmission may be rate-matched around the second set of resources and the set of resources carrying at least one of the PSFCH or the associated gap. For example, at 1126, the first UE 1102 may rate-match a sidelink transmission around at least one of the first periodic resources for the PSFCH or the second periodic resources for the SL-RS. Particularly, 1212 may be performed by a rate-matching component 1846.

At 1214, the UE may transmit the sidelink transmission. The sidelink transmission may include at least one of the PSSCH, the PSFCH, or the SL-RS. The sidelink transmission may be communicated on one of the first set of slots or the second set of slots based on at least one of a cast type of the sidelink transmission or the capability to support the rate-matching of the sidelink transmission around at least one of the first periodic resources for the PSFCH or the second periodic resources for the SL-RS, based on the sidelink configuration received at 1204. The first set of slots may be configured for unicast sidelink transmissions between UEs having the capability to support the rate-matching of the sidelink transmission around at least one of the first periodic resources for the PSFCH or the second periodic resources for the SL-RS. The resource pool may also be configured for unicast sidelink transmissions between multiple UEs having the capabilities to support the rate-matching of the sidelink transmission around at least one of the first periodic resources for the PSFCH or the second periodic resources for the SL-RS. For example, at 1130, the first UE 1102 may transmit the sidelink transmission. Particularly, 1214 may be performed by a sidelink communication component 1848.

Figure 13:
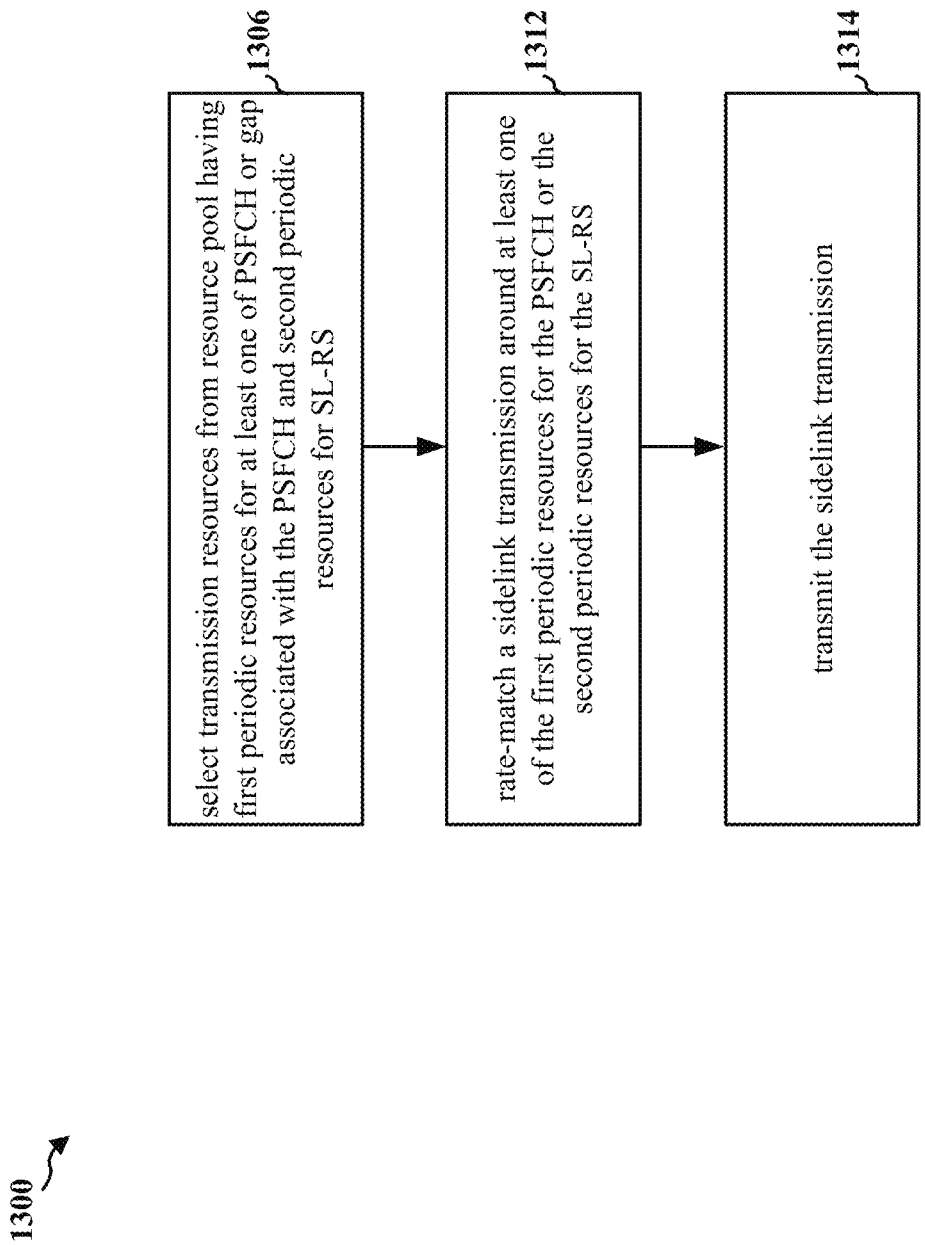
FIG. 13 is a flowchart of a method of wireless communication.

FIG. 13 is a flowchart 1300 of a method of wireless communication. The method may be performed by a UE (e.g., the UE 104; the first UE 1102; the apparatus 1802). The UE may be configured by the base station to communicate the PSSCH on the resource pool. The UE may have the capability to support the SL-RS and rate-matching the PSSCH around the multiplexed SL-RS and PSFCH. Here, the UE may be the transmitting UE.

At 1306, the UE may select transmission resources from a resource pool having first periodic resources for at least one of a PSFCH or a gap associated with the PSFCH and second periodic resources for SL-RS. The second periodic resources for the SL-RS may be configured to avoid an overlap, in a time-domain, with the first periodic resources for the PSFCH. In one aspect, the second periodic resources for the SL-RS may have the same periodicity as the second periodic resources for the PSFCH and be configured in different slots than the second periodic resources for the PSFCH. For example, at 1120, first UE 1102 may select transmission resources from a resource pool having first periodic resources for at least one of a PSFCH or a gap associated with the PSFCH and second periodic resources for SL-RS. Particularly, 1306 may be performed by a resource selection component 1844.

At 1312, the UE may rate-match a sidelink transmission around at least one of the first periodic resources for the PSFCH or the second periodic resources for the SL-RS. That is, the UE may rate-match the PSSCH around at least one of the first periodic resources for the PSFCH or the second periodic resources for the SL-RS. In one aspect, a bandwidth of the SL-RS is greater than a bandwidth of the PSSCH. The sidelink transmission may be rate-matched around the second set of resources and the set of resources carrying at least one of the PSFCH or the associated gap. For example, at 1126, the first UE 1102 may rate-match a sidelink transmission around at least one of the first periodic resources for the PSFCH or the second periodic resources for the SL-RS. Particularly, 1312 may be performed by a rate-matching component 1846.

At 1314, the UE may transmit the sidelink transmission. The sidelink transmission may include at least one of the PSSCH, the PSFCH, or the SL-RS. The sidelink transmission may be communicated on one of the first set of slots or the second set of slots based on at least one of a cast type of the sidelink transmission or the capability to support the rate-matching of the sidelink transmission around at least one of the first periodic resources for the PSFCH or the second periodic resources for the SL-RS, based on the sidelink configuration received at 1304. The first set of slots may be configured for unicast sidelink transmissions between UEs having the capability to support the rate-matching of the sidelink transmission around at least one of the first periodic resources for the PSFCH or the second periodic resources for the SL-RS. The resource pool may also be configured for unicast sidelink transmissions between multiple UEs having the capabilities to support the rate-matching of the sidelink transmission around at least one of the first periodic resources for the PSFCH or the second periodic resources for the SL-RS. For example, at 1130, the first UE 1102 may transmit the sidelink transmission. Particularly, 1314 may be performed by a sidelink communication component 1848.

Figure 14:
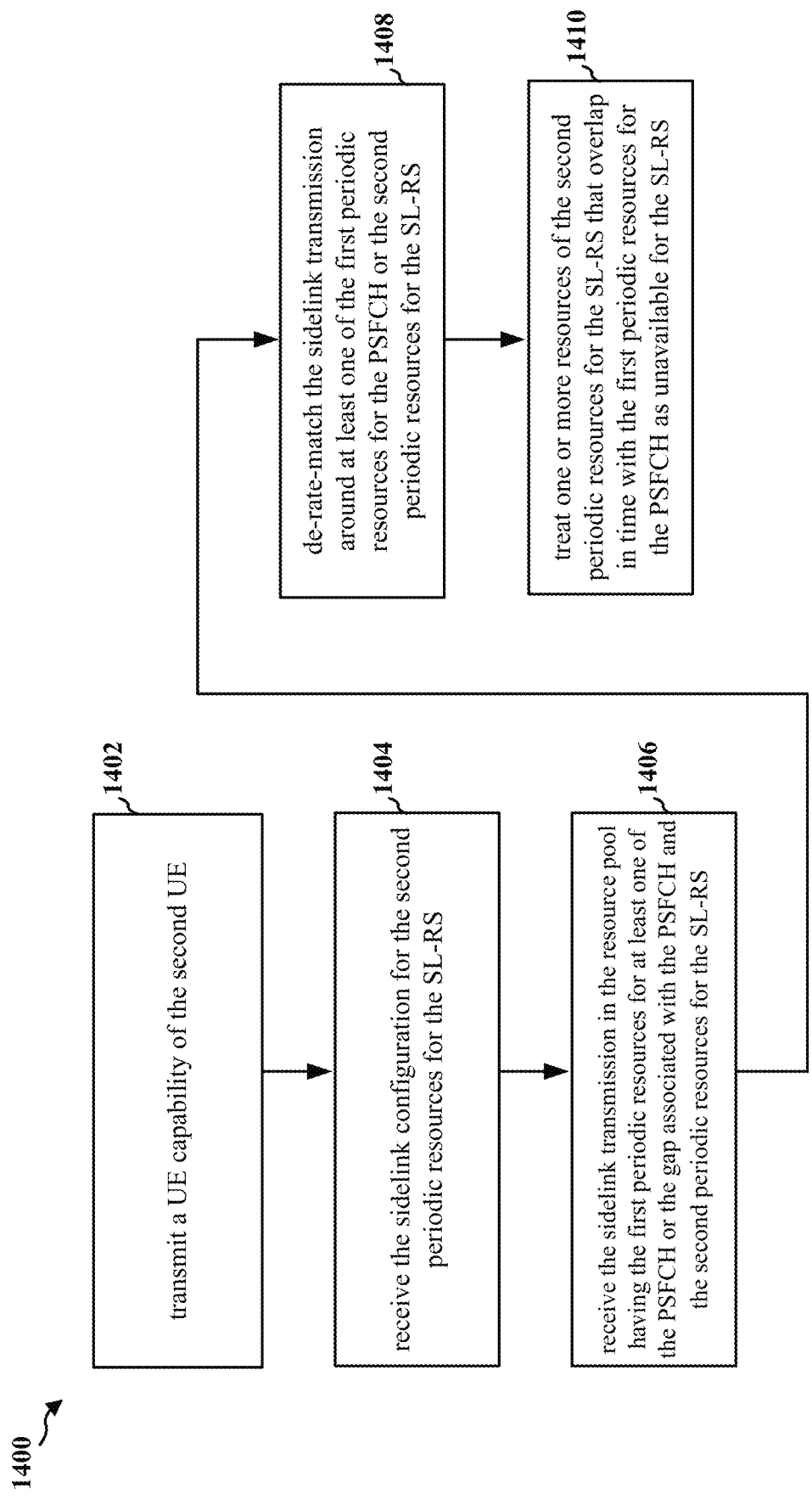
FIG. 14 is a flowchart of a method of wireless communication.

FIG. 14 is a flowchart 1400 of a method of wireless communication. The method may be performed by a UE (e.g., the UE 104; the second UE 1104; the apparatus 1802). The UE may be configured by the base station to communicate the PSSCH on the resource pool. The UE may have the capability to support the SL-RS and rate-matching the PSSCH around the multiplexed SL-RS and PSFCH. Here, the UE may be the receiving UE.

At 1402, the UE may transmit a UE capability of the UE 1104 to the base station, the UE capability indicating support of the UE for at least one SL-RS. The UE capability of the UE may indicate that the UE has the capability to support the SL-RS and rate-matching the PSSCH around the multiplexed SL-RS and PSFCH. For example, at 1111, the UE 1104 may transmit a UE capability of the UE 1104 to the base station 1106, the UE capability indicating support of the UE 1104 for at least one SL-RS. Particularly, 1402 may be performed by a UE capability component 1840.

The base station may determine one or more sidelink configurations based on the UE capabilities received from the UE. The base station may transmit, to the one or more UEs, sidelink configurations for at least one of the one or more UEs to communicate sidelink transmissions in the resource pool having first periodic resources for at least one of the PSFCH or the gap associated with the PSFCH and second periodic resources for the SL-RS, the sidelink transmissions being rate-matched around at least one of the first periodic resources for the PSFCH or the second periodic resources for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. The sidelink configuration may also indicate a first set of slots of the resource pool for a first set of UEs that support the rate-matching of the sidelink transmission to communicate the SL-RS in the first set of slots, and a second set of slots of the resource pool for a second set of UEs that do not support the rate-matching of the sidelink transmission. The first set of slots may be configured for unicast sidelink transmissions between UEs having the capability to support the rate-matching of the sidelink transmission.

At 1404, the UE may receive the sidelink configuration for the second periodic resources for the SL-RS, the sidelink configuration allocating the first set of resources in the resource pool for the SL-RS. The sidelink configuration may be received from the base station directly or via a relaying UE. The sidelink configuration may instruct the UE that the first set of resources is allocated in the resource pool for the SL-RS. For example, the resource pool may include a first set of slots including the first periodic resources and the second periodic resources for the sidelink RS and a second set of slots including the first periodic resources but free of the second periodic resources for the sidelink RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the de-rate-matching of the sidelink transmission around at least one of the first periodic resources for the PSFCH or the second periodic resources for the SL-RS. That is, the UE may select to use the first set of slots and/or the second set of slots based on a cast type of the sidelink transmission. Also, the UE may select to use the first set of slots and/or the second set of slots based on the capability of the UE to support the rate-matching of the sidelink transmission around at least one of the first periodic resources for the PSFCH or the second periodic resources for the sidelink RS. The first set of slots may be different than a second set of slots associated with UEs that do not support the rate-matching of the sidelink transmission around at least one of the first periodic resources for the PSFCH or the second periodic resources for the SL-RS. For example, at 1115, the UE 1104 may receive the sidelink configuration for the second periodic resources for the SL-RS, the sidelink configuration allocating the first set of resources in the resource pool for the SL-RS. Particularly, 1404 may be performed by a sidelink configuration component 1842.

At 1406, the UE may receive the sidelink transmission in the resource pool having the first periodic resources for at least one of the PSFCH or the gap associated with the PSFCH and the second periodic resources for the SL-RS. The sidelink transmission may include at least one of the PSSCH, the PSFCH, or the SL-RS. The sidelink transmission may be communicated on one of the first set of slots or the second set of slots based on at least one of a cast type of the sidelink transmission or the capability to support the rate-matching of the sidelink transmission around at least one of the first periodic resources for the PSFCH or the second periodic resources for the SL-RS, based on the sidelink configuration received at 1115. The first set of slots may be configured for unicast sidelink transmissions between UEs having the capability to support the rate-matching of the sidelink transmission around at least one of the first periodic resources for the PSFCH or the second periodic resources for the SL-RS. The resource pool may also be configured for unicast sidelink transmissions between the multiple UEs having a capability to support the rate-matching of the sidelink transmission around at least one of the first periodic resources for the PSFCH or the second periodic resources for the SL-RS. For example, at 1130, the second UE 1104 may receive the sidelink transmission in the resource pool having the first periodic resources for at least one of the PSFCH or the gap associated with the PSFCH and the second periodic resources for the SL-RS. Particularly, 1406 may be performed by a sidelink communication component 1848.

At 1408, the UE may de-rate-match the sidelink transmission around at least one of the first periodic resources for the PSFCH or the second periodic resources for the SL-RS. The sidelink transmission may be de-rate-matched around the second set of resources and the set of resources carrying at least one of the PSFCH. For example, at 1132, the second UE 1104 may de-rate-match the sidelink transmission around at least one of the first periodic resources for the PSFCH or the second periodic resources for the SL-RS. Particularly, 1408 may be performed by a rate-matching component 1846.

At 1410, the UE may treat one or more resources of the second periodic resources for the SL-RS that overlap in time with the first periodic resources for the PSFCH as unavailable for the SL-RS. For example, at 1134, the second UE 1104 may treat one or more resources of the second periodic resources for the SL-RS that overlap in time with the first periodic resources for the PSFCH as unavailable for the SL-RS. Particularly, 1410 may be performed by a resource selection component 1844.

Figure 15:
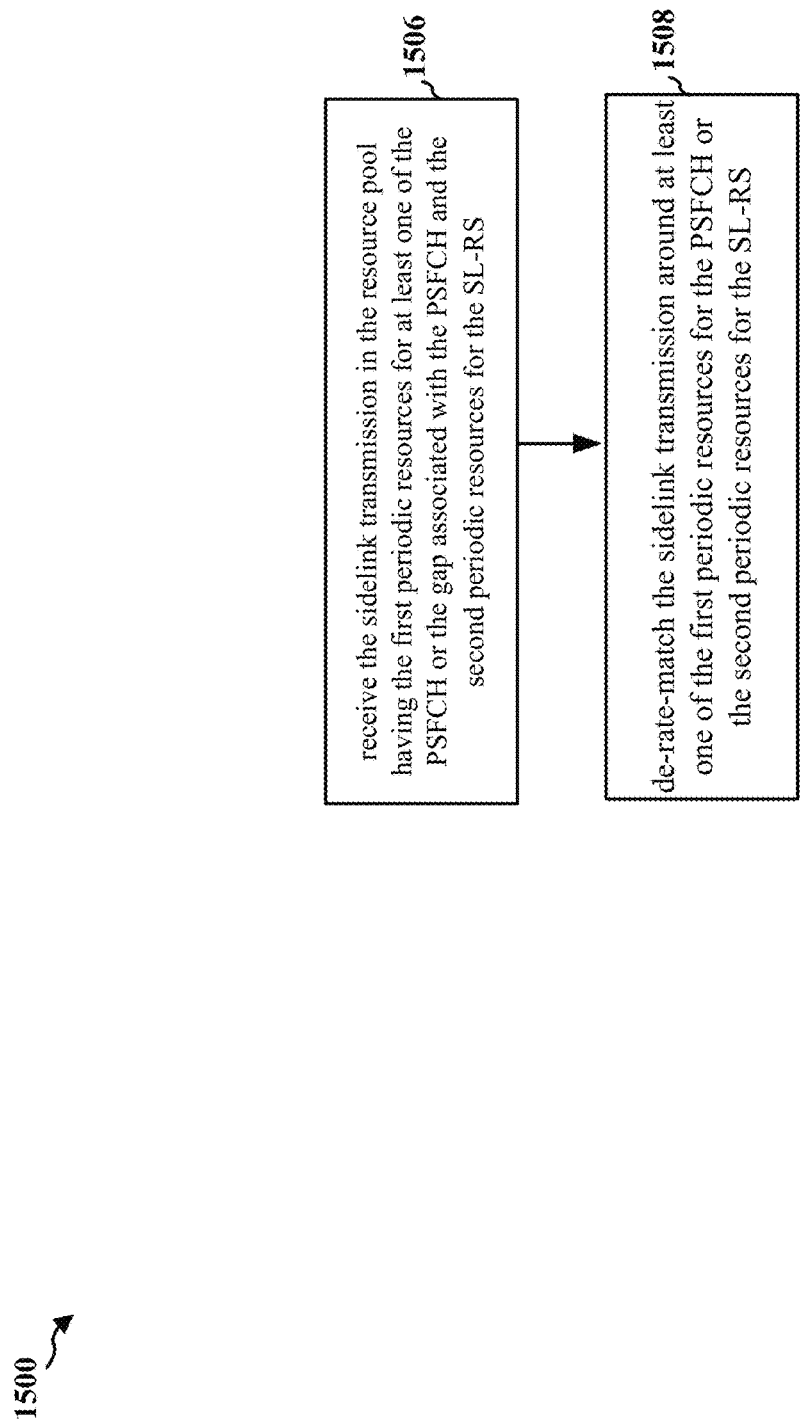
FIG. 15 is a flowchart of a method of wireless communication.

FIG. 15 is a flowchart 1500 of a method of wireless communication. The method may be performed by a UE (e.g., the UE 104; the second UE 1104; the apparatus 1802). The UE may be configured by the base station to communicate the PSSCH on the resource pool. The UE may have the capability to support the SL-RS and rate-matching the PSSCH around the multiplexed SL-RS and PSFCH. Here, the UE may be the receiving UE.

At 1506, the UE may receive the sidelink transmission in the resource pool having the first periodic resources for at least one of the PSFCH or the gap associated with the PSFCH and the second periodic resources for the SL-RS. The sidelink transmission may include at least one of the PSSCH, the PSFCH, or the SL-RS. The sidelink transmission may be communicated on one of the first set of slots or the second set of slots based on at least one of a cast type of the sidelink transmission or the capability to support the rate-matching of the sidelink transmission around at least one of the first periodic resources for the PSFCH or the second periodic resources for the SL-RS, based on the sidelink configuration received at 1115. The first set of slots may be configured for unicast sidelink transmissions between UEs having the capability to support the rate-matching of the sidelink transmission around at least one of the first periodic resources for the PSFCH or the second periodic resources for the SL-RS. The resource pool may also be configured for unicast sidelink transmissions between the multiple UEs having a capability to support the rate-matching of the sidelink transmission around at least one of the first periodic resources for the PSFCH or the second periodic resources for the SL-RS. For example, at 1130, the second UE 1104 may receive the sidelink transmission in the resource pool having the first periodic resources for at least one of the PSFCH or the gap associated with the PSFCH and the second periodic resources for the SL-RS. Particularly, 1506 may be performed by a sidelink communication component 1848.

At 1508, the UE may de-rate-match the sidelink transmission around at least one of the first periodic resources for the PSFCH or the second periodic resources for the SL-RS. The sidelink transmission may be de-rate-matched around the second set of resources and the set of resources carrying at least one of the PSFCH. For example, at 1132, the second UE 1104 may de-rate-match the sidelink transmission around at least one of the first periodic resources for the PSFCH or the second periodic resources for the SL-RS. Particularly, 1508 may be performed by a rate-matching component 1846.

Figure 16:
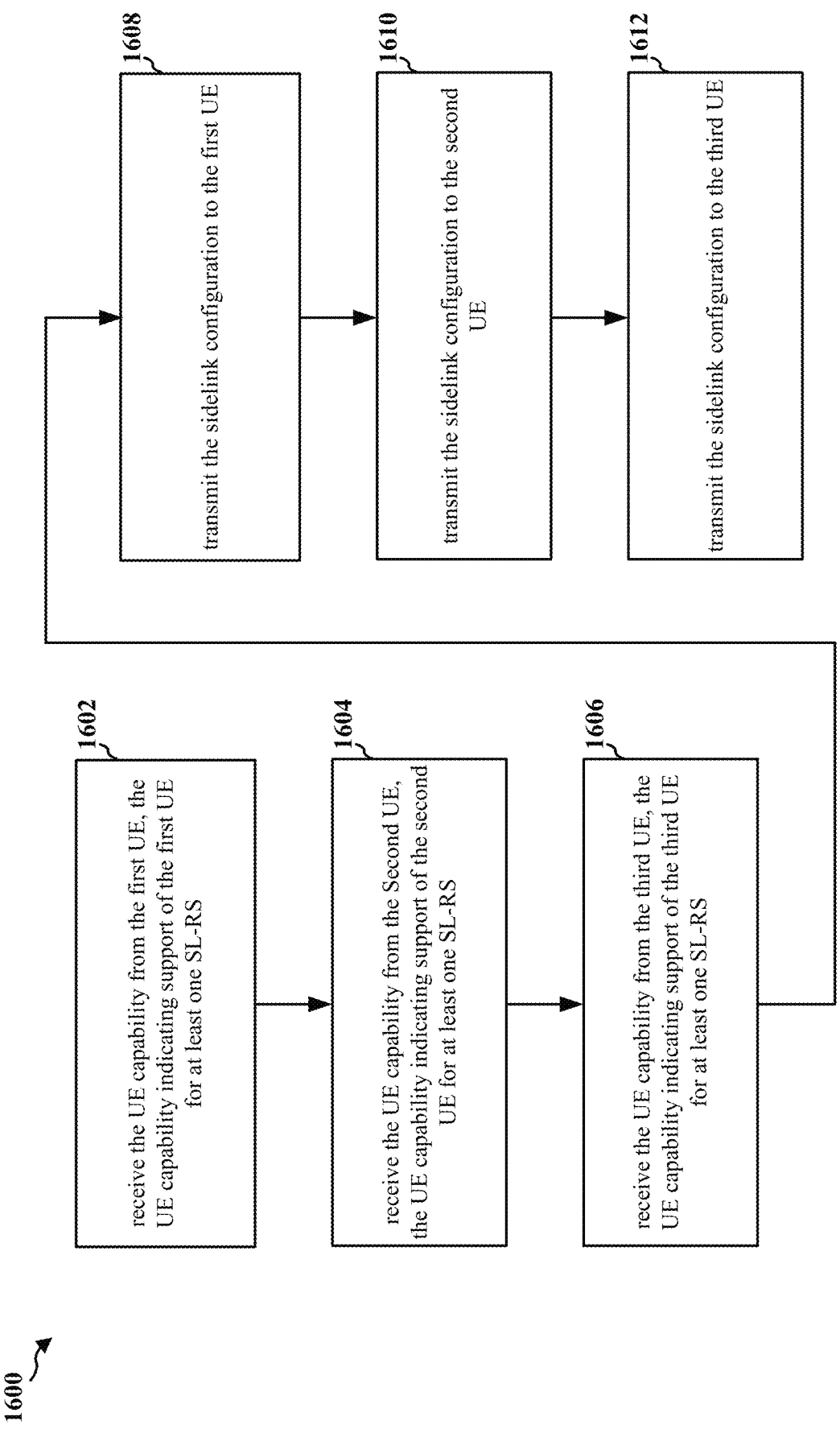
FIG. 16 is a flowchart of a method of wireless communication.

FIG. 16 is a flowchart 1600 of a method of wireless communication. The method may be performed by a base station (e.g., the base station 102/180/1106; the apparatus 1902). The base station may configure a plurality of UEs to communicate the PSSCH on the resource pool. The plurality of UEs may include the first UE and the second UE having the capabilities to support the SL-RS and rate-matching the PSSCH around the multiplexed SL-RS and PSFCH, and the third UE not having the capability to support the SL-RS and rate-matching the PSSCH around the multiplexed SL-RS and PSFCH.

At 1602, the base station may receive the UE capability from the first UE, the UE capability indicating support of the first UE for at least one SL-RS. The UE capability of the first UE may indicate that the first UE has the capability to support the SL-RS and rate-matching the PSSCH around the multiplexed SL-RS and PSFCH. For example, at 1110, the base station 1106 may receive the UE capability from the first UE 1102, the UE capability indicating support of the first UE 1102 for at least one SL-RS. Particularly, 1602 may be performed by a UE capability component 1940.

At 1604, the base station may receive the UE capability from the second UE, the UE capability indicating support of the second UE for at least one SL-RS. The UE capability of the second UE may indicate that the second UE has the capability to support the SL-RS and rate-matching the PSSCH around the multiplexed SL-RS and PSFCH. For example, at 1111, the base station 1106 may receive the UE capability from the second UE 1104, the UE capability indicating support of the second UE 1104 for at least one SL-RS. Particularly, 1604 may be performed by the UE capability component 1940.

At 1606, the base station may receive the UE capability from the third UE 1108, the UE capability indicating support of the third UE for at least one SL-RS. The UE capability of the third UE 1108 may indicate that the third UE 1108 do not have the capability to support the SL-RS and rate-matching the PSSCH around the multiplexed SL-RS and PSFCH. For example, at 1112, the base station 1106 may receive the UE capability from the third UE 1108, the UE capability indicating support of the third UE 1108 for at least one SL-RS. Particularly, 1606 may be performed by the UE capability component 1940.

The base station may determine one or more sidelink configurations based on the UE capabilities received from the first UE, the second UE, and the third UE. The base station may transmit, to the one or more UEs, sidelink configurations for at least one of the one or more UEs to communicate sidelink transmissions in the resource pool having first periodic resources for at least one of the PSFCH or the gap associated with the PSFCH and second periodic resources for the SL-RS, the sidelink transmissions being rate-matched around at least one of the first periodic resources for the PSFCH or the second periodic resources for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. The sidelink configuration may also indicate a first set of slots of the resource pool for a first set of UEs that support the rate-matching of the sidelink transmission to communicate the SL-RS in the first set of slots, and a second set of slots of the resource pool for a second set of UEs that do not support the rate-matching of the sidelink transmission. The first set of slots may be configured for unicast sidelink transmissions between UEs having the capability to support the rate-matching of the sidelink transmission.

At 1608, the base station may transmit the sidelink configuration to the first UE. The sidelink configuration may instruct the first UE to allocate a first set of resources in the resource pool for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the rate-matching of the sidelink transmission around at least one of the first periodic resources for the PSFCH or the second periodic resources for the SL-RS. The first set of slots may be different than a second set of slots associated with UEs that do not support the rate-matching of the sidelink transmission around at least one of the first periodic resources for the PSFCH or the second periodic resources for the SL-RS. For example, at 1114, the base station 1106 may transmit the sidelink configuration to the first UE 1102. Particularly, 1608 may be performed by a sidelink configuration component 1942.

At 1610, the base station may transmit the sidelink configuration to the second UE. The sidelink configuration may instruct the second UE that the first set of resources is allocated in the resource pool for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the de-rate-matching of the sidelink transmission around at least one of the first periodic resources for the PSFCH or the second periodic resources for the SL-RS. The first set of slots may be different than a second set of slots associated with UEs that do not support the rate-matching of the sidelink transmission around at least one of the first periodic resources for the PSFCH or the second periodic resources for the SL-RS. For example, at 1115, the base station 1106 may transmit the sidelink configuration to the second UE 1104. Particularly, 1610 may be performed by the sidelink configuration component 1942.

At 1612, the base station may transmit the sidelink configuration to the third UE. Here, the third UE may not have the capability to support the SL-RS and rate-matching the PSSCH around the multiplexed SL-RS and PSFCH, and therefore, the base station may instruct the third UE to communicate on the second set of slots of the resource pool. For example, at 1116, the base station 1106 may transmit the sidelink configuration to the third UE 1108. Particularly, 1612 may be performed by the sidelink configuration component 1942.

Figure 17:
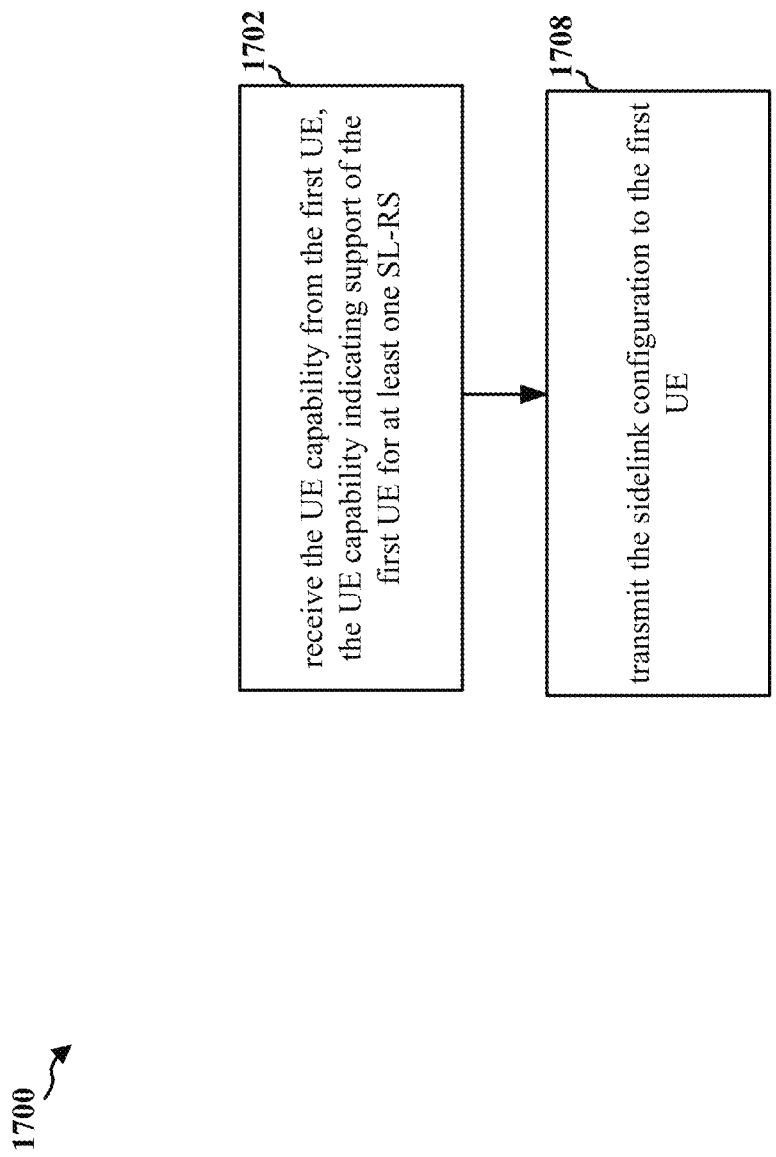
FIG. 17 is a flowchart of a method of wireless communication.

FIG. 17 is a flowchart 1700 of a method of wireless communication. The method may be performed by a base station (e.g., the base station 102/180/1106; the apparatus 1902). The base station may configure a plurality of UEs to communicate the PSSCH on the resource pool. The plurality of UEs may include the first UE and the second UE having the capabilities to support the SL-RS and rate-matching the PSSCH around the multiplexed SL-RS and PSFCH, and the third UE not having the capability to support the SL-RS and rate-matching the PSSCH around the multiplexed SL-RS and PSFCH.

At 1702, the base station may receive the UE capability from the first UE, the UE capability indicating support of the first UE for at least one SL-RS. The UE capability of the first UE may indicate that the first UE has the capability to support the SL-RS and rate-matching the PSSCH around the multiplexed SL-RS and PSFCH. For example, at 1110, the base station 1106 may receive the UE capability from the first UE 1102, the UE capability indicating support of the first UE 1102 for at least one SL-RS. Particularly, 1702 may be performed by a UE capability component 1940.

At 1708, the base station may transmit the sidelink configuration to the first UE. The sidelink configuration may instruct the first UE to allocate a first set of resources in the resource pool for the SL-RS. The sidelink configuration may include a first configuration of a first set of resources for the SL-RS in a non-PSFCH slot not carrying the PSFCH and a second configuration of a second set of resources in a PSFCH slot carrying the PSFCH. In one aspect, the configuration of the first periodic resources and the second periodic resources in a first set of slots may be received based on a capability of the UE to support the rate-matching of the sidelink transmission around at least one of the first periodic resources for the PSFCH or the second periodic resources for the SL-RS. The first set of slots may be different than a second set of slots associated with UEs that do not support the rate-matching of the sidelink transmission around at least one of the first periodic resources for the PSFCH or the second periodic resources for the SL-RS. For example, at 1114, the base station 1106 may transmit the sidelink configuration to the first UE 1102. Particularly, 1708 may be performed by a sidelink configuration component 1942.

Figure 18:
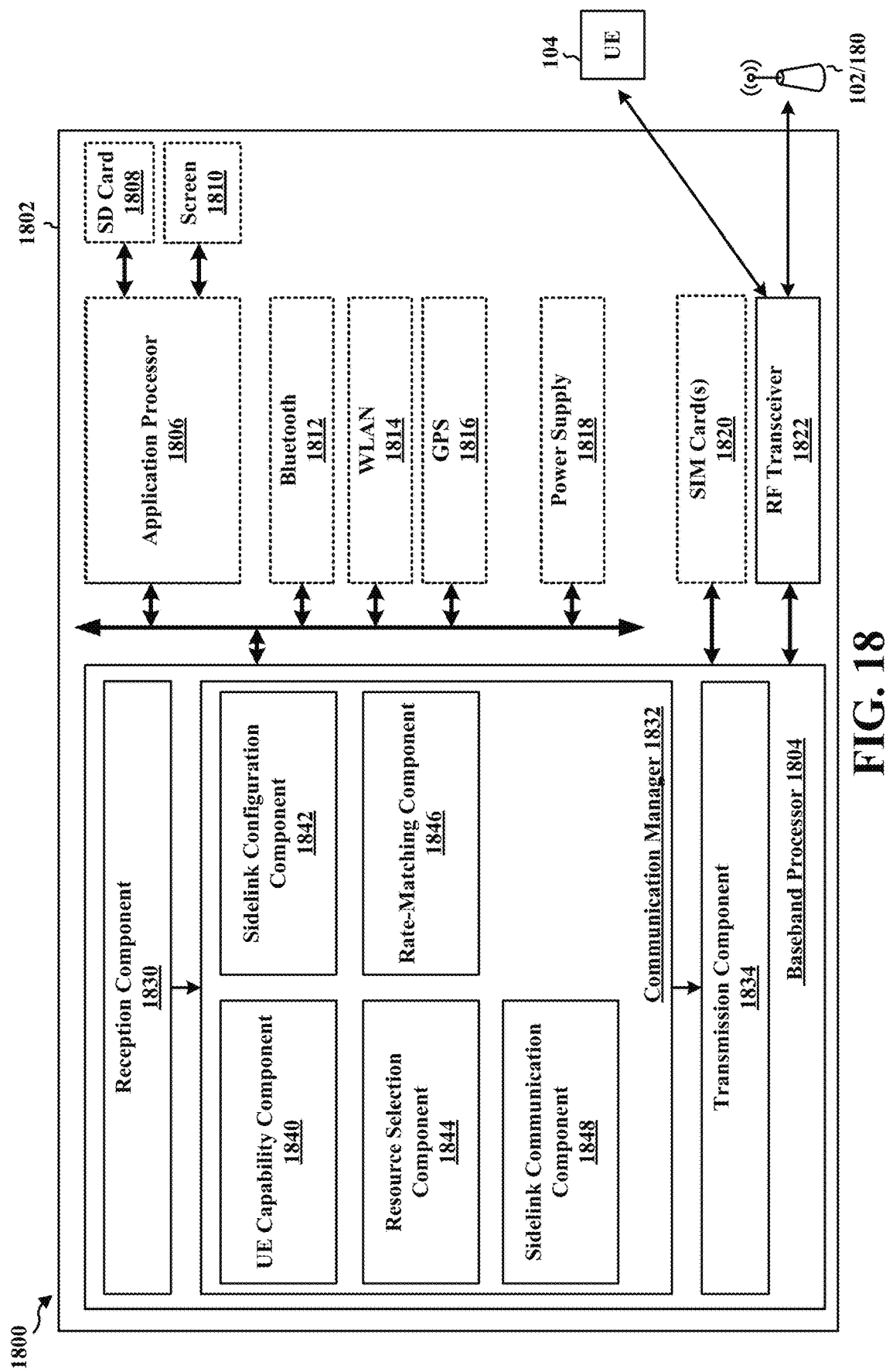
FIG. 18 is a diagram illustrating an example of a hardware implementation for an example apparatus.

FIG. 18 is a diagram 1800 illustrating an example of a hardware implementation for an apparatus 1802. The apparatus 1802 may be a UE, or another device configured to transmit and/or receive sidelink communication. The apparatus 1802 includes a baseband processor 1804 (also referred to as a modem) coupled to a RF transceiver 1822. In some aspects, the baseband processor 1804 may be a cellular baseband processor and/or the RF transceiver 1822 may be a cellular RF transceiver. The apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, and/or a power supply 1818. The baseband processor 1804 communicates through the RF transceiver 1822 with the UE 104 and/or BS 102/180. The baseband processor 1804 may include a computer-readable medium/memory. The computer-readable medium/memory may be non-transitory. The baseband processor 1804 is responsible for general processing, including the execution of software stored on the computer-readable medium/memory. The software, when executed by the baseband processor 1804, causes the baseband processor 1804 to perform the various functions described in the present application. The computer-readable medium/memory may also be used for storing data that is manipulated by the baseband processor 1804 when executing software. The baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the baseband processor 1804. The baseband processor 1804 may be a component of the device 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a UE capability component 1840 that is configured to transmit a UE capability of the UE to the base station, e.g., as described in connection with 1202 and 1402. The communication manager 1832 further includes a sidelink configuration component 1842 that is configured to receive, from the base station, the sidelink configuration for the second periodic resources for the SL-RS, the sidelink configuration allocating the first set of resources in the resource pool for the SL-RS, e.g., as described in connection with 1204 and 1404. The communication manager 1832 further includes a resource selection component 1844 that is configured to select transmission resources from a resource pool having first periodic resources for at least one of a PSFCH or a gap associated with the PSFCH and second periodic resources for SL-RS, shift, in a time-domain, the second periodic resources for the SL-RS based on an overlap in time with the first periodic resources for the PSFCH, and treat one or more resources of the second periodic resources for the SL-RS that overlap in time with the first periodic resources for the PSFCH as unavailable for the SL-RS, e.g., as described in connection with 1206, 1208, 1210, 1306, and 1410. The communication manager 1832 further includes a rate-matching component 1846 that is configured to rate-match or de-rate-match the sidelink transmission around at least one of the first periodic resources for the PSFCH or the second periodic resources for the SL-RS, e.g., as described in connection with 1212, 1312, 1408, and 1508. The communication manager 1832 further includes a sidelink communication component 1848 that is configured to transmit or receive the sidelink transmission in the resource pool having the first periodic resources for at least one of the PSFCH or the gap associated with the PSFCH and the second periodic resources for the SL-RS, e.g., as described in connection with 1214, 1314, 1406, and 1506.

The apparatus may include additional components that perform each of the blocks of the algorithm in the flowcharts of FIGS. 11, 12, 13, 14, and 15. As such, each block in the flowcharts of FIGS. 11, 12, 13, 14, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the baseband processor 1804, includes means for selecting transmission resources from a resource pool having first periodic resources for at least one of a PSFCH or a gap associated with the PSFCH and second periodic resources for a sidelink RS, means for rate-matching a sidelink transmission around at least one of the first periodic resources for the PSFCH or the second periodic resources for the sidelink RS, and means for transmitting the sidelink transmission. The apparatus 1802 includes means for receiving a sidelink transmission in a resource pool having first periodic resources for at least one of a PSFCH or a gap associated with the PSFCH and second periodic resources for a sidelink RS, and means for de-rate-matching the sidelink transmission around at least one of the first periodic resources for the PSFCH or the second periodic resources for the sidelink RS. The apparatus 1802 includes means for shifting, in a time-domain, the second periodic resources for the sidelink RS based on an overlap in time with the first periodic resources for the PSFCH or the gap associated with the PSFCH. The apparatus 1802 includes means for receiving a sidelink configuration for the second periodic resources for the sidelink RS, the sidelink configuration allocating a first set of resources in the resource pool for the sidelink RS, and means for receiving a first configuration of a first set of resources for the sidelink RS in a non-PSFCH slot not carrying the PSFCH and a second configuration of a second set of resources in a PSFCH slot carrying the PSFCH. The apparatus 1802 includes means for treating one or more resources of the second periodic resources for the sidelink RS that overlap in time with the first periodic resources for the PSFCH as unavailable for the sidelink RS. The apparatus 1802 includes means for transmitting or receiving the sidelink transmission on one of the first set of slots or the second set of slots based on a cast type of the sidelink transmission, means for transmit or receiving the sidelink transmission on one of the first set of slots or the second set of slots based on a cast type of the sidelink transmission, and means for transmitting or receiving the sidelink transmission on one of the first set of slots or the second set of slots based on a capability to support the rate-matching of the sidelink transmission around at least one of the first periodic resources for the PSFCH or the second periodic resources for the sidelink RS. The means may be one or more of the components of the apparatus 1802 configured to perform the functions recited by the means. As described herein, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
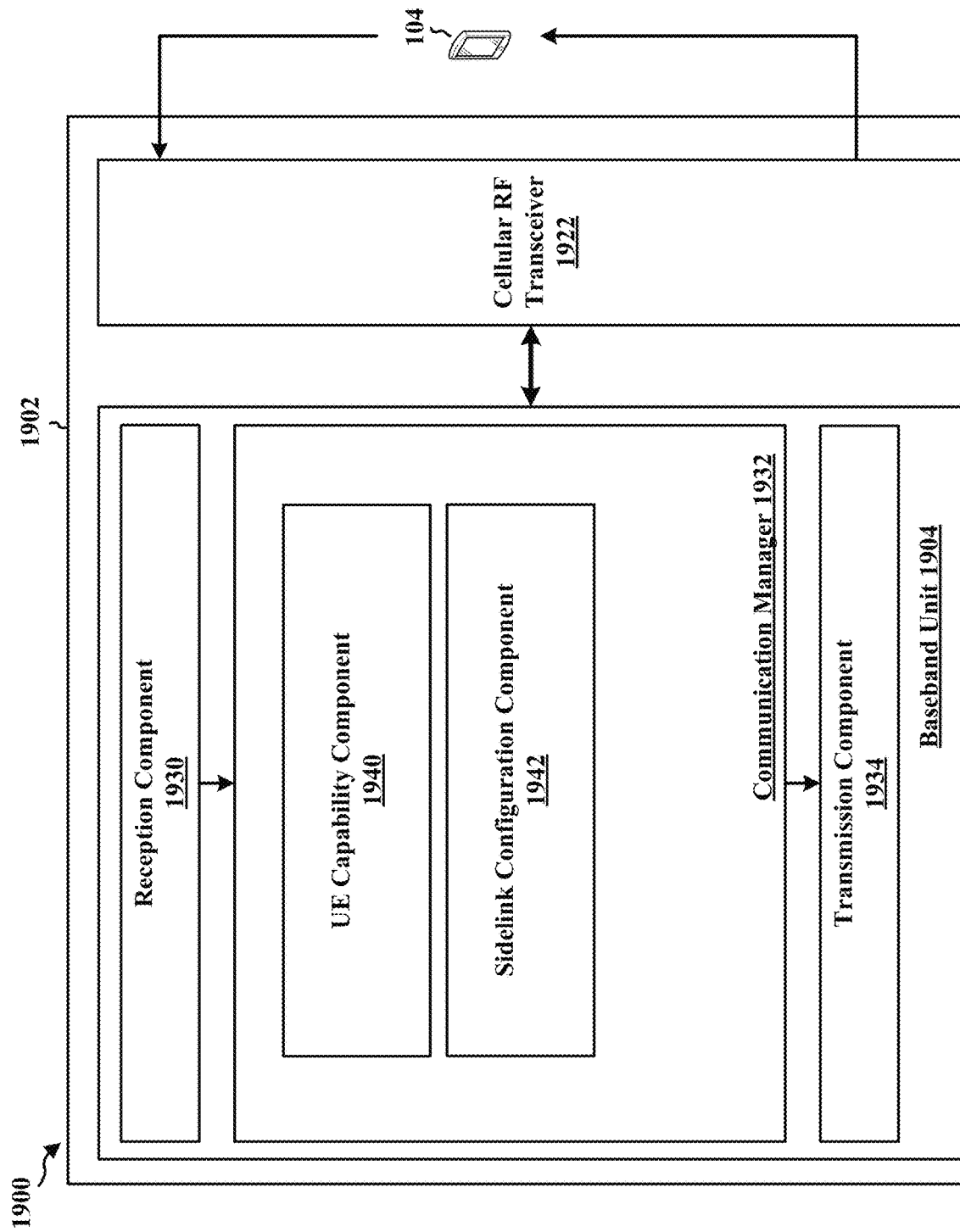
FIG. 19 is a diagram illustrating an example of a hardware implementation for an example apparatus.

FIG. 19 is a diagram 1900 illustrating an example of a hardware implementation for an apparatus 1902. The apparatus 1902 may be a base station, a component of a base station, or may implement base station functionality. In some aspects, the apparatus 1802 may include a baseband unit 1904. The baseband unit 1904 may communicate through a cellular RF transceiver 1922 with the UE 104. The baseband unit 1904 may include a computer-readable medium/memory. The baseband unit 1904 is responsible for general processing, including the execution of software stored on the computer-readable medium/memory. The software, when executed by the baseband unit 1904, causes the baseband unit 1904 to perform the various functions described supra. The computer-readable medium/memory may also be used for storing data that is manipulated by the baseband unit 1904 when executing software. The baseband unit 1904 further includes a reception component 1930, a communication manager 1932, and a transmission component 1934. The communication manager 1932 includes the one or more illustrated components. The components within the communication manager 1932 may be stored in the computer-readable medium/memory and/or configured as hardware within the baseband unit 1904. The baseband unit 1904 may be a component of the base station 310 and may include the memory 376 and/or at least one of the TX processor 316, the RX processor 370, and the controller/processor 375.

The communication manager 1932 includes a UE capability component 1940 that is configured to receive the UE capability from UEs, the UE capability indicating support of the UEs for at least one SL-RS, e.g., as described in connection with 1602, 1604, 1606, and 1702. The communication manager 1932 further includes a sidelink configuration component 1942 that is configured to transmit the sidelink configuration to the UEs, e.g., as described in connection with 1608, 1610, 1612, and 1708.

The apparatus may include additional components that perform each of the blocks of the algorithm in the flowcharts of FIGS. 11, 16, and 17. As such, each block in the flowcharts of FIGS. 11, 16, and 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1902 may include a variety of components configured for various functions. In one configuration, the apparatus 1902, and in particular the baseband unit 1904, includes means for receiving UE capabilities from one or more UEs, the UE capabilities indicating support for at least one sidelink RS, and means for transmitting, to the one or more UEs, sidelink configurations for at least one of the one or more UEs to communicate sidelink transmissions in a resource pool having first periodic resources for at least one of a PSFCH or a gap associated with the PSFCH and second periodic resources for the sidelink RS, the sidelink transmissions being rate-matched around at least one of the first periodic resources for the PSFCH or the second periodic resources for the sidelink RS. The means may be one or more of the components of the apparatus 1902 configured to perform the functions recited by the means. As described supra, the apparatus 1902 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may include a base station and UEs configured to communicate via sidelink communication. The UEs may select transmission resources from a resource pool including first periodic resources for PSFCH and second periodic resources for SL-RS, and rate-match the PSSCH around at least one of the first period resources or the second period resources. The second periodic resources may be shifted in time or canceled based on the first periodic resources.

In one aspect, the second periodic resources for the SL-RS in the PSFCH slots may be shifted in time based on the first periodic resources, and the shifted resources for the SL-RS may not overlap with the PSFCH and the gap symbols disposed at respective sides of the PSFCH. In another aspect, at least a part of the second periodic resources for the SL-RS in the PSFCH slots that are configured to overlap with the PSFCH may be canceled.

In some aspects, the base station may configure the UEs based on the UEs' capabilities to support the SL-RS and rate-matching the PSSCH around the multiplexed SL-RS and PSFCH. Furthermore, the base station may configure a first set of slots and a second set of slots within the resource pool, and the first set of slots and the second set of slots may be configured mutually exclusive so that the UEs with different capabilities.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to select transmission resources from a resource pool having first periodic resources for at least one of a PSFCH or a gap associated with the PSFCH and second periodic resources for a sidelink RS, rate-match a sidelink transmission around at least one of the first periodic resources for the PSFCH or the second periodic resources for the sidelink RS, and transmit the sidelink transmission.

Aspect 2 is the apparatus of aspect 1, where a bandwidth of the sidelink RS is greater than a bandwidth of a PSSCH.

Aspect 3 is the apparatus of any of aspects 1 and 2, where the second periodic resources for the sidelink RS is configured to avoid an overlap, in a time-domain, with the first periodic resources for the PSFCH.

Aspect 4 is the apparatus of any of aspects 1 to 3, where the second periodic resources for the sidelink RS has a same periodicity as the second periodic resources for the PSFCH and are configured in different slots than the second periodic resources for the PSFCH.

Aspect 5 is the apparatus of any of aspects 1 to 4, where, to select the transmission resources from the resource pool, the at least one processor and the memory are configured to shift, in a time-domain, the second periodic resources for the sidelink RS based on an overlap in time with the first periodic resources for the PSFCH or the gap associated with the PSFCH.

Aspect 6 is the apparatus of aspect 5, where the at least one processor and the memory are configured to receive a sidelink configuration for the second periodic resources for the sidelink RS, the sidelink configuration allocating a first set of resources in the resource pool for the sidelink RS, where in a slot including the PSFCH, the first set of resources are shifted, in the time-domain, from the first set of resources by a first number of resources, the first number of resources corresponding to a set of resources carrying at least one of the PSFCH or the associated gap, and the sidelink transmission is rate-matched around the second set of resources and the set of resources carrying at least one of the PSFCH or the associated gap.

Aspect 7 is the apparatus of any of aspects 5 and 6, where the at least one processor and the memory are configured to receive a first configuration of a first set of resources for the sidelink RS in a non-PSFCH slot not carrying the PSFCH and a second configuration of a second set of resources in a PSFCH slot carrying the PSFCH.

Aspect 8 is the apparatus of any of aspects 1 to 7, where, to select the transmission resources from the resource pool, the at least one processor and the memory are further configured to treat one or more resources of the second periodic resources for the sidelink RS that overlap in time with the first periodic resources for the PSFCH as unavailable for the sidelink RS.

Aspect 9 is the apparatus of any of aspects 1 to 8, where the resource pool includes a first set of slots including the second periodic resources for the sidelink RS and a second set of slots free of the second periodic resources for the sidelink RS.

Aspect 10 is the apparatus of aspect 9, where the at least one processor and the memory are configured to transmit the sidelink transmission on one of the first set of slots or the second set of slots based on a cast type of the sidelink transmission.

Aspect 11 is the apparatus of any of aspects 9 and 10, where the at least one processor and the memory are configured to transmit the sidelink transmission on one of the first set of slots or the second set of slots based on a capability to support the rate-matching of the sidelink transmission around at least one of the first periodic resources for the PSFCH or the second periodic resources for the sidelink RS.

Aspect 12 is the apparatus of aspect 11, where the first set of slots is configured for unicast sidelink transmissions between UEs having the capability to support the rate-matching of the sidelink transmission around at least one of the first periodic resources for the PSFCH or the second periodic resources for the sidelink RS.

Aspect 13 is the apparatus of any of aspects 1 to 12, where the resource pool is configured for unicast sidelink transmissions between UEs having a capability to support the rate-matching of the sidelink transmission around at least one of the first periodic resources for the PSFCH or the second periodic resources for the sidelink RS.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is an apparatus for wireless communication including at least one processor coupled to a memory and configured to receive a sidelink transmission in a resource pool having first periodic resources for at least one of a PSFCH or a gap associated with the PSFCH and second periodic resources for a sidelink RS, and de-rate-match the sidelink transmission around at least one of the first periodic resources for the PSFCH or the second periodic resources for the sidelink RS.

Aspect 18 is the apparatus of aspect 17, where the second periodic resources for sidelink RS is configured to avoid an overlap, in a time-domain, with the first periodic resources.

Aspect 19 is the apparatus of any of aspects 17 and 18, where the second periodic resources for the sidelink RS has a same periodicity as the second periodic resources for the PSFCH and are configured in different slots than the second periodic resources for the PSFCH.

Aspect 20 is the apparatus of any of aspects 17 to 19, where, the second periodic resources for the sidelink RS are shifted, in a time-domain, to avoid an overlap in time with the first periodic resources for the PSFCH or the gap associated with the PSFCH.

Aspect 21 is the apparatus of aspect 20, where the at least one processor and the memory are configured to receive a sidelink configuration for the second periodic resources for the sidelink RS, the sidelink configuration allocating a first set of resources in the resource pool for the sidelink RS, where, in a slot including the PSFCH, the first set of resources are shifted, in the time-domain, from the first set of resources by a first number of resources, the first number of resources corresponding to the set of resources carrying at least one of the PSFCH or the associated gap, and the sidelink transmission is de-rate-matched around the second set of resources and the set of resources carrying at least one of the PSFCH.

Aspect 22 is the apparatus of any of aspects 20 and 21, where the at least one processor and the memory are configured to receive the sidelink transmission on one of the first set of slots or the second set of slots based on a cast type of the sidelink transmission.

Aspect 23 is the apparatus of any of aspects 17 to 22, where the at least one processor and the memory are further configured to treat one or more resources of the second periodic resources for the sidelink RS that overlap in time with the first periodic resources for the PSFCH as unavailable for the sidelink RS.

Aspect 24 is the apparatus of any of aspects 17 to 23, where the resource pool includes a first set of slots including the second periodic resources for the sidelink RS and a second set of slots free of the second periodic resources for the sidelink RS.

Aspect 25 is the apparatus of aspect 24, where the sidelink transmission is communicated on one of the first set of slots or the second set of slots based on a cast type of the sidelink transmission.

Aspect 26 is the apparatus of any of aspects 24 and 25, where the sidelink transmission is communicated on one of the first set of slots or the second set of slots based on a capability to support the de-rate-matching of the sidelink transmission around at least one of the first periodic resources for the PSFCH or the second periodic resources for the sidelink RS.

Aspect 27 is the apparatus of any of aspects 17 to 26, where the resource pool is configured for unicast sidelink transmissions between UEs having a capability to support the de-rate-matching of the sidelink transmission around at least one of the first periodic resources for the PSFCH or the second periodic resources for the sidelink RS.

Aspect 28 is a method of wireless communication for implementing any of aspects 17 to 27.

Aspect 29 is an apparatus for wireless communication including means for implementing any of aspects 17 to 27.

Aspect 30 is a computer-readable medium storing computer executable code, where the code when executed by a processor causes the processor to implement any of aspects 17 to 27.

Aspect 31 is an apparatus for wireless communication including at least one processor coupled to a memory and configured to receive UE capabilities from one or more UEs, the UE capabilities indicating support for at least one sidelink RS, and transmit, to the one or more UEs, sidelink configurations for at least one of the one or more UEs to communicate sidelink transmissions in a resource pool having first periodic resources for at least one of a PSFCH or a gap associated with the PSFCH and second periodic resources for the sidelink RS, the sidelink transmissions being rate-matched around at least one of the first periodic resources for the PSFCH or the second periodic resources for the sidelink RS.

Aspect 32 is the apparatus of aspect 31, where the second periodic resources for the sidelink RS in a PSFCH slot including the first periodic resources for the PSFCH is shifted, in a time-domain, to avoid an overlap, in the time-domain, with the first periodic resources for the PSFCH.

Aspect 33 is the apparatus of any of aspects 31 and 32, where the sidelink configuration includes a first configuration of a first set of resources for the sidelink RS in a non-PSFCH slot not carrying the PSFCH and a second configuration of a second set of resources in a PSFCH slot carrying the PSFCH.

Aspect 34 is the apparatus of any of aspects 31 to 33, where the sidelink configuration indicates a first set of slots of the resource pool for a first set of UEs that support the rate-matching of the sidelink transmission to communicate the sidelink RS in the first set of slots, and a second set of slots of the resource pool for a second set of UEs that do not support the rate-matching of the sidelink transmission.

Aspect 35 is the apparatus of aspect 34, where the first set of slots is different than the second set of slots associated with UEs that do not support the rate-matching of the sidelink transmission.

Aspect 36 is the apparatus of any of aspects 34 and 35, where the first set of slots is configured for unicast sidelink transmissions between UEs having the capability to support the rate-matching of the sidelink transmission.

Aspect 37 is a method of wireless communication for implementing any of aspects 31 to 36.

Aspect 38 is an apparatus for wireless communication including means for implementing any of aspects 31 to 36.

Aspect 39 is a computer-readable medium storing computer executable code, where the code when executed by a processor causes the processor to implement any of aspects 31 to 36.

What is claimed is:

1. An apparatus for wireless communication at a user equipment (UE), comprising:
   memory; and
   at least one processor coupled to the memory and configured to cause the apparatus to:
   select transmission resources from a resource pool, the resource pool having:
   first periodic resources for at least one of a physical sidelink feedback channel (PSFCH) or a gap associated with the PSFCH, and
   second periodic resources for a sidelink reference signal (RS);
   rate-match a sidelink transmission around at least one of the first periodic resources for the PSFCH or the second periodic resources for the sidelink RS; and
   transmit the sidelink transmission.

2. The apparatus of claim 1, wherein a first bandwidth of the sidelink RS is greater than a second bandwidth of a physical shared channel (PSSCH).

3. The apparatus of claim 1, wherein the second periodic resources for the sidelink RS is configured to avoid an overlap, in a time-domain, with the first periodic resources for the PSFCH.

4. The apparatus of claim 1, wherein the second periodic resources for the sidelink RS has a same periodicity as the second periodic resources for the PSFCH and are configured in different slots than the second periodic resources for the PSFCH.

5. The apparatus of claim 1, wherein, to select the transmission resources from the resource pool, the at least one processor is configured to cause the apparatus to:
   shift, in a time-domain, the second periodic resources for the sidelink RS based on an overlap in time with the first periodic resources for the PSFCH or the gap associated with the PSFCH.

6. The apparatus of claim 5, wherein the at least one processor is configured to cause the apparatus to:
   receive a sidelink configuration for the second periodic resources for the sidelink RS, the sidelink configuration allocating a first set of resources in the resource pool for the sidelink RS,
   wherein in a slot including the PSFCH, the first set of resources are shifted, in the time-domain, from the first set of resources by a first number of resources, the first number of resources corresponding to a set of resources carrying at least one of the PSFCH or the gap associated with the PSFCH; and
   the sidelink transmission is rate-matched around the second periodic resources and the set of resources carrying at least one of the PSFCH or the gap associated with the PSFCH.

7. The apparatus of claim 5, wherein the at least one processor is configured to cause the apparatus to:
   receive a first configuration of a first set of resources for the sidelink RS in a non-PSFCH slot not carrying the PSFCH and a second configuration of a second set of resources in a PSFCH slot carrying the PSFCH.

8. The apparatus of claim 1, wherein, to select the transmission resources from the resource pool, the at least one processor is further configured to cause the apparatus to: treat one or more resources of the second periodic resources for the sidelink RS that overlap in time with the first periodic resources for the PSFCH as unavailable for the sidelink RS.

9. The apparatus of claim 1, wherein the resource pool includes a first set of slots including the second periodic resources for the sidelink RS and a second set of slots free of the second periodic resources for the sidelink RS.

10. The apparatus of claim 9, wherein the at least one processor is configured to cause the apparatus to transmit the sidelink transmission on one of the first set of slots or the second set of slots based on a cast type of the sidelink transmission.

11. The apparatus of claim 9, wherein the at least one processor is configured to cause the apparatus to transmit the sidelink transmission on one of the first set of slots or the second set of slots based on a capability to support rate-matching of the sidelink transmission around at least one of the first periodic resources for the PSFCH or the second periodic resources for the sidelink RS.

12. The apparatus of claim 11, wherein the first set of slots is configured for unicast sidelink transmissions between UEs having the capability to support rate-matching of the sidelink transmission around at least one of the first periodic resources for the PSFCH or the second periodic resources for the sidelink RS.

13. The apparatus of claim 1, wherein the resource pool is configured for unicast sidelink transmissions between UEs having a capability to support rate-matching of the sidelink transmission around at least one of the first periodic resources for the PSFCH or the second periodic resources for the sidelink RS.

14. An apparatus for wireless communication at a user equipment (UE), comprising:
memory; and
at least one processor coupled to the memory and configured to cause the apparatus to:
receive a sidelink transmission in a resource pool, the resource pool having:
first periodic resources for at least one of a physical sidelink feedback channel (PSFCH) or a gap associated with the PSFCH, and
second periodic resources for a sidelink reference signal (RS); and
de-rate-match the sidelink transmission around at least one of the first periodic resources for the PSFCH or the second periodic resources for the sidelink RS.

15. The apparatus of claim 14, wherein the second periodic resources for sidelink RS is configured to avoid an overlap, in a time-domain, with the first periodic resources.

16. The apparatus of claim 14, wherein the second periodic resources for the sidelink RS has a same periodicity as the second periodic resources for the PSFCH and are configured in different slots than the second periodic resources for the PSFCH.

17. The apparatus of claim 14, wherein, the second periodic resources for the sidelink RS are shifted, in a time-domain, to avoid an overlap in time with the first periodic resources for the PSFCH or the gap associated with the PSFCH.

18. The apparatus of claim 17, wherein the at least one processor is configured to cause the apparatus to:
receive a sidelink configuration for the second periodic resources for the sidelink RS, the sidelink configuration allocating a first set of resources in the resource pool for the sidelink RS,
wherein, in a slot including the PSFCH, the first set of resources are shifted, in the time-domain, from the first set of resources by a first number of resources, the first number of resources corresponding to the first periodic resources carrying at least one of the PSFCH or the gap associated with the PSFCH; and
the sidelink transmission is de-rate-matched around the first set of resources and the first periodic resources carrying at least one of the PSFCH.

19. The apparatus of claim 17, wherein the at least one processor is configured to cause the apparatus to:
receive a first configuration of a first set of resources for the sidelink RS in a non-PSFCH slot not carrying the PSFCH and a second configuration of a second set of resources in a PSFCH slot carrying the PSFCH.

20. The apparatus of claim 14, wherein the at least one processor is configured to cause the apparatus to:
treat one or more resources of the second periodic resources for the sidelink RS that overlap in time with the first periodic resources for the PSFCH as unavailable for the sidelink RS.

21. The apparatus of claim 14, wherein the resource pool includes a first set of slots including the second periodic resources for the sidelink RS and a second set of slots free of the second periodic resources for the sidelink RS.

22. The apparatus of claim 21, wherein the at least one processor is configured to cause the apparatus to receive the sidelink transmission on one of the first set of slots or the second set of slots based on a cast type of the sidelink transmission.

23. The apparatus of claim 21, wherein the at least one processor is configured to cause the apparatus to receive the sidelink transmission on one of the first set of slots or the second set of slots based on a capability to support de-rate-matching of the sidelink transmission around at least one of the first periodic resources for the PSFCH or the second periodic resources for the sidelink RS.

24. The apparatus of claim 14, wherein the resource pool is configured for unicast sidelink transmissions between UEs having a capability to support de-rate-matching of the sidelink transmission around at least one of the first periodic resources for the PSFCH or the second periodic resources for the sidelink RS.

25. An apparatus for wireless communication at a base station, comprising:
memory; and
at least one processor coupled to the memory and configured to cause the apparatus to:
receive information indicating user equipment (UE) capabilities from one or more UEs, the UE capabilities indicating support for at least one sidelink reference signal (RS); and
transmit, to the one or more UEs, sidelink configurations for at least one of the one or more UEs to communicate sidelink transmissions in a resource pool, the resource pool having:
first periodic resources for at least one of a physical sidelink feedback channel (PSFCH) or a gap associated with the PSFCH, and
second periodic resources for the sidelink RS, the sidelink transmissions being rate-matched around at least one of the first periodic resources for the PSFCH or the second periodic resources for the sidelink RS.

26. The apparatus of claim 25, wherein the second periodic resources for the sidelink RS in a PSFCH slot including the first periodic resources for the PSFCH is shifted, in a time-domain, to avoid an overlap, in the time-domain, with the first periodic resources for the PSFCH.

27. The apparatus of claim 25, wherein the sidelink configurations include a first configuration of a first set of resources for the sidelink RS in a non-PSFCH slot not carrying the PSFCH and a second configuration of a second set of resources in a PSFCH slot carrying the PSFCH.

28. The apparatus of claim 25, wherein the sidelink configurations indicate a first set of slots of the resource pool for a first set of UEs that support rate-matching of a sidelink transmission to communicate the sidelink RS in the first set of slots, and a second set of slots of the resource pool for a second set of UEs that do not support the rate-matching of the sidelink transmission.

29. The apparatus of claim 28, wherein the first set of slots is different than the second set of slots associated with UEs that do not support the rate-matching of the sidelink transmission.

30. The apparatus of claim 28, wherein the first set of slots is configured for unicast sidelink transmissions between UEs supporting the rate-matching of the sidelink transmission.

* * * * *